US006906158B2

(12) United States Patent
Tully

(10) Patent No.: US 6,906,158 B2
(45) Date of Patent: Jun. 14, 2005

(54) COMPOSITIONS AND METHODS OF VINYL OXAZOLONE POLYMERIZATION

(75) Inventor: David Tully, San Diego, CA (US)

(73) Assignee: IRM, LLC, Hamilton (BM)

( * ) Notice: Subject to any disclaimer, the term of this patent is extended or adjusted under 35 U.S.C. 154(b) by 0 days.

(21) Appl. No.: 10/799,360

(22) Filed: Mar. 11, 2004

(65) Prior Publication Data

US 2004/0242840 A1 Dec. 2, 2004

Related U.S. Application Data

(60) Provisional application No. 60/454,956, filed on Mar. 13, 2003, provisional application No. 60/460,158, filed on Apr. 2, 2003, and provisional application No. 60/472,974, filed on May 23, 2003.

(51) Int. Cl.[7] .............................................. C08F 26/06
(52) U.S. Cl. ....................... 526/258; 526/260; 526/263; 526/266; 528/424
(58) Field of Search ................................ 526/258, 260, 526/263, 266; 528/424

(56) References Cited

U.S. PATENT DOCUMENTS 4,581,429 A    4/1986  Solomon et al.

FOREIGN PATENT DOCUMENTS

| WO | WO 96/24620 | 8/1996 |
| WO | WO 98/19705 | 5/1998 |
| WO | WO 98/56424 | 12/1998 |
| WO | WO 98/56425 | 12/1998 |
| WO | WO 99/03894 | 1/1999 |
| WO | WO 02/056021 | 7/2002 |

OTHER PUBLICATIONS

Benoit et al., "Accurate Structural Control and Block Formation in the Living Polymerization of 1,3–Dienes by Nitroxide–Mediated Procedures" Macromolecules (2000) vol. 33:363–370.*
Benoit et al., "Development of a Universal Alkoxyamine for "Living" Free Radical Polymerizations" J. Am. Chem. Soc. (1999) vol. 121:3904–3920.
Coleman et al., "Immobilization of Protein A at High Density on Azlactone–Functional Polymeric Beads and their use in Affinity Chromatography" J. Chromatography (1990) vol. 512:345–363.
Drtina et al., "Highly Cross–Linked Azlactone Functional Supports of Tailorable Polarity" Macromolecules (1996) vol. 29:4486–4489.
Fazio et al., "Synthesis and Polymerization of 2–(p–Vinylphenyl)–4,4–Dimethyl–5–Oxazolone: A Novel Monomer for Making Polymeric Reagents" J. Poly. Sci. Part A: Poly. Chem. (1992) vol. 30:329–331.
Hawker et al., "New Polymer Synthesis by Nitroxide Living Radical Polymerizations" Chem. Rev. (2001) vol. 101:3661–3688.
Heilmann et al., "Chemistry and Technology of 2–Alkenyl Azlactones" J. Polym. Sci. Part A: Polym. Chem. (2001) vol. 39:3655–3677.

(Continued)

Primary Examiner—William K. Cheung
(74) Attorney, Agent, or Firm—Timothy L. Smith; Angela P. Horne; Quine Intellectual Property Law Group, P.C.

(57) ABSTRACT

This invention provides novel methods for synthesis of narrow polydispersity oxazolone-containing polymers via nitroxide-mediated living free radical polymerization, as well as the products and derivatives thereof.

54 Claims, 9 Drawing Sheets

VDMO

VPDMO

IDMO

OTHER PUBLICATIONS

Iwakura et al., "Copolymerization of 2–Isopropenyl–4, 4–dialkyl–5–oxozolones with Styrene" *J. Polym. Sci., Part A–1* (1968) vol. 6:2681–2686.

Iwakura et al., "Copolymerization of Isoprenyl and Isopropylidene Oxazolones with Styrene" *J. Polym. Sci., Part A–1* (1966) vol. 4:2649–2657.

Malmström et al., "Development of a New Class of Rate–Acclerating Additives for Nitroxide–Medicated 'Living' Free Radical Polymerization" *Tetrahedron* (1997) vol. 53:15225–15236.

Muthiah and Mathias "Copolymers of 2–Vinyl–4, 4–Dimethlazlactone with Styrene and Ethyl α–Hydroxymethylacrylate" *J. Polym. Sci. Part A: Polym. Chem.* (1991) vol. 29:29–37.

Peterson et al., "Enzymatic Microreactor–on–a–Chip: Protein Mapping Using Trypsin Immobilized on Porous Polymer Monoliths Molded in Channels of Microfluidic Devices" *Anal. Chem.* (2002) vol. 74:4081–4088.

Taylor et al., "Synthesis and Polymerization of 2–Vinyl–4, 4–Dimethyl–5–Oxazolone" *Polymer Lett.* (1971) vol. 9:187–190.

Taylor et al., "Synthesis of Poly (4,4–dimethyl–2–vinyl–5–oxazolone) an Interesting Material for Preparing Polymeric Agents" *Makromol Chem. Rapid Commun.* (1982) vol. 3, 779–782.

Tripp et al., "Reative Filtration": Use of Functionalized Porous Polymer Monoliths as Scavengers in Solution–Phase Synthesis *J. Org. Lett.* (2000) vol. 2:195–198.

Tripp et al., "Grafted Macroporous Polymer Monolithic Disks: A New Format of Scavengers for Solution–Phase Combinatorial Chemistry" *J. Comb. Chem.* (2001) vol. 3:216–223.

Tully et al., "Synthesis of Reactive Poly(vinyl oxazolones) via Nitroxide–Mediated 'Living' Free Radical Polymerization" *Macromolecules* (2003) vol. 36:4302–4308.

Xie et al., "Design for Reactive Porous Polymer Supports for High Throughput Bioreactors: Poly(2–vinyl–4,4–Dimethylazlactone–co–acrylamide–co–ethylene Dimethacrylate) Monoliths" *J. Biotechnol. Bioeng.* (1999) vol. 62:30–35.

\* cited by examiner

US 6,906,158 B2

COMPOSITIONS AND METHODS OF VINYL OXAZOLONE POLYMERIZATION

CROSS REFERENCE TO RELATED APPLICATION

This application is related to from U.S. provisional patent applications U.S. Ser. No. 60/454,956 filed Mar. 13, 2003, U.S. Ser. No. 60/460,158 filed Apr. 2, 2003, and U.S. Ser. No. 60/472,974 filed May 23, 2003, the disclosures of which are incorporated by reference. The present application claims priority to, and benefit of, these applications, pursuant to 35 U.S.C. § 119(e) and any other applicable statute or rule.

COPYRIGHT NOTIFICATION

Pursuant to 37 C.F.R. 1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to novel methods for synthesis of oxazolone-containing polymers via nitroxide-mediated living free radical polymerization, as well as the products and derivatives thereof.

BACKGROUND OF THE INVENTION

Vinyl-functionalized oxazolones (e.g., "azlactones") represent a unique class of bifunctional monomers; the most widely studied monomer in this category is 2-vinyl-4,4-dimethyl-5-oxazolone (VDMO). VDMO, also commonly referred to as vinyl azlactone or vinyl azlactone, has been used in a number of acrylamide- and acrylate-based insoluble polymer supports for enzyme immobilization and affinity chromatography (see, for example, Coleman et al. (1990) *J. Chromatography* 512:345–363; Drtina et al. (1996) *Macromolecules* 29:4486–4489; and Hellmann et al. (2001) *J. Polym. Sci., Part A: Polymer Chem.*39:3677). Poly(VDMO) has also been grafted onto molded macroporous polymer monoliths (Peterson et al. (2002) *J. Anal. Chem.* 74:4081–4088; Xie et al. (1999) *J. Biotechnol. Bioeng.* 62:29–35). In addition, these materials can be used as effective amine scavengers for organic syntheses (Tripp et al. (2000) *J. Org. Lett.* 2:195–198; Tripp et al. (2001) *J. Combi. Chem.* 3:216–223).

There have been several reports regarding the traditional free radical copolymerization of VDMO using azo-initiators. However, VDMO has a tendency to homopolymerize relative to the comonomer, resulting in depletion of VDMO at low conversions. Consequently, the resulting product polymer is a complex mixture of copolymer chains having both a heterogeneous microstructure as well as a broad molecular weight distribution. The present invention overcomes these and other difficulties in the art, by providing methods for the synthesis of oxazolone-containing polymers having defined architecture and narrow polydispersity.

SUMMARY OF THE INVENTION

The present invention provides for the novel synthesis of polymers incorporating vinyl-functionalized oxazolone (azlactone) units in the polymer chain. Homopolymers as well as random (e.g., statistical) and block copolymers of vinyl-functionalized oxazolone monomers have been produced via nitroxide-mediated living radical polymerization methods of the present invention. The polymers of the present invention can be used, for example, in the preparation of surface grafted polymer multilayers (e.g., for the covalent immobilization of proteins and peptides to chemically modified surfaces) or for the preparation of polymer-bound active agents (e.g., drug formulations, diagnostic agents, and the like).

In one aspect, the present invention provides methods of synthesizing a poly(oxazolone) homopolymer via a nitroxide-mediated controlled living free radical polymerization reaction. The methods include the steps of a) providing an oxazolone propagating species having a free radical moiety; b) reacting the oxazolone propagating species with a vinyl-functionalized oxazolone monomer, thereby producing an extended oxazolone propagating species; c) coupling a nitroxide capping compound with the extended oxazolone propagating species and forming an intermediary dormant species; d) dissociating the nitroxide capping compound from the intermediary dormant species, thereby regenerating the extended oxazolone propagating species; and e) repeating the reacting, coupling, and dissociating steps with additional vinyl-functionalized oxazolone monomers, thereby synthesizing the poly(oxazolone) homopolymer via a nitroxide-mediated controlled living free radical polymerization reaction.

The poly(oxazolone) homopolymer is typically generated using a homogeneous pool of oxazolone monomers. However, the methods of the present invention can also be employed to generate an oxazolone polymer using a combination of oxazolone subunits. Two preferred oxazolone monomers for use (independently or in combination) in the methods of the present invention are 2-vinyl-4,4-dimethyl-5-oxazolone (VDMO) and 2-(4'-vinyl)-phenyl-4,4-dimethyl-5-oxazolone (VPDMO).

In some embodiments of the present invention, the methods generate a polymer having a polydispersity of less than or equal to 1.20 as determined, for example, by size exclusion chromatography, gel permeation chromatography, laser light scattering, or any other method used by one of skill in the art to determine the molecular weights (Mn and/or Mw) of a polymer. Optionally, the methods of the present invention can be used to generate polymers having even more narrow polydispersities, e.g., a polydispersity of less than or equal to 1.15, or less than or equal to 1.10, and/or having a weight average molecular weight greater than approximately 5000 Da, or optionally between approximately 10,000 Da and 100,000 Da.

In one embodiment, the oxazolone propagating species used in the present invention is provided by a) providing a first monomer comprising the vinyl-functionalized oxazolone compound; b) providing an alkoxyamine compound capable of dissociating into a first nitroxide portion and a second free radical portion; and c) reacting the second free radical portion of the dissociated alkoxyamine compound with the first monomer, thereby forming a oxazolone propagating species. Exemplary alkoxyamine compounds for use in the methods of the present invention include, but are not limited to, N-(1,1-dimethylethyl)-α(1-methyl ethyl)-N-(1-phenyl ethoxy)-benzene methanamine and 2,2,6,6-tetramethyl-1-(1-phenylethoxy) piperidine. Optionally, the first nitroxide portion of the alkoxyamine compound can be employed as the nitroxide capping compound in the coupling step of the provided methods.

The coupling, dissociating and reacting steps are performed at elevated temperatures, for example, between 100°

C. and 130° C., and the reactions are typically allowed to run for between 1 and 24 hours. In some embodiments, the reaction mixture is supplemented with an additional quantity of free nitroxide (e.g., a 5% molar excess of free nitroxide with respect to alkoxyamine). Optionally, the resulting polymer is further processed by suspending the poly(oxazolone) homopolymer in a first solvent (e.g., chloroform) and precipitating the homopolymer in a second solvent (e.g., hexane) to form a precipitate. The precipitate can then be filtered, optionally further washed in solvent, and dried under a vacuum.

In another embodiment, the present invention provides methods of synthesizing oxazolone-containing copolymers via a nitroxide-mediated controlled living free radical polymerization reaction. Either random copolymers or block copolymers can be prepared by the provided methods. In these embodiments, the methods for synthesizing the oxazolone-containing copolymers include the steps of a) providing a plurality of monomers comprising a first set of vinyl-functionalized oxazolone compounds and a second set of second monomers; b) providing a reactive polymer propagating species having a free radical moiety; c) reacting the reactive polymer propagating species with a member of the plurality of monomers, thereby producing an extended reactive polymer propagating species; d) coupling a nitroxide capping compound with the extended reactive polymer propagating species and forming an intermediary dormant polymer species; e) dissociating the nitroxide capping compound from the intermediary dormant polymer species, thereby regenerating the extended reactive polymer propagating species; and f) repeating the reacting, coupling, and dissociating steps with additional member monomers, thereby synthesizing the oxazolone-containing copolymer via a nitroxide-mediated controlled living free radical polymerization reaction.

As in the previously-described methods for generation of oxazolone-containing homopolymers, the methods can be used to generate a polymer having a polydispersity of less than or equal to 1.20 as determined, for example, by size exclusion chromatography, gel permeation chromatography, laser light scattering, or the like. Optionally, the methods can be used to generate polymers having more narrow polydispersities, e.g., a polydispersity of less than or equal to 1.15, or less than or equal to 1.10, and/or having a weight average molecular weight greater than approximately 5000 Da, or optionally between approximately 10,000 Da and 100,000 Da.

The copolymer can be either a random copolymer (e.g., both sets of monomers are provided at the same time) or a block copolymer (e.g., the two sets of monomer are provided during different series of repeat cycles). In addition, the copolymer can comprise varying proportions of first and second monomers. For example, the plurality of monomers optionally can include equal proportions of both monomers (i.e., 50% oxazolone monomers and 50% second monomers). Alternatively, disparate proportions of monomer sets (e.g., 10% oxazolone monomers and 90% second monomers, 90% oxazolone monomers and 10% second monomers, and the like) can be employed.

The first set of vinyl-functionalized oxazolone compounds can be provided as either a single oxazolone monomer composition or a combination of two or more oxazolone monomers. Two preferred oxazolone monomers for use (independently or in combination) in the methods of the present invention are 2-vinyl-4,4-dimethyl-5-oxazolone (VDMO) and 2-(4'-vinyl)-phenyl-4,4-dimethyl-5-oxazolone (VPDMO).

The second set of monomers can be selected from any of a number of monomeric units, including, but not limited to, styrene, substituted styrene, alkyl acrylate, substituted alkyl acrylate, alkyl methacrylate, substituted alkyl methacrylate, acrylic acid, methacrylic acid, acrylonitrile, methacrylonitrile, acrylamide, N-alkylacrylamide, N-alkylmethacrylamide, N,N-dialkylacrylamide, N,N-dialkylmethacrylamide, isoprene, butadiene, ethylene, vinyl acetate, vinylidene chloride, vinylidene fluoride, vinyl chloride, vinyl fluoride, tetrafluoroethylene, 4-vinyl pyridine, 3-vinyl pyridine, 2-vinyl pyridine, N-vinyl amides, and combinations thereof.

In the methods of the present invention, providing the reactive polymer propagating species can optionally be performed by a) providing an initiator/control agent comprising an alkoxyamine compound capable of dissociating into a first nitroxide portion and a second free radical portion; and b) reacting the second free radical portion of the dissociated alkoxyamine compound with a member of the plurality of monomers, thereby forming a reactive polymer propagating species. Either an oxazolone monomer a member of the second monomer species can be used to initiate the polymer reaction.

In a further embodiment, the present invention provides methods for synthesizing oxazolone-containing block copolymers, including the steps of a) providing a reactive polymer propagating species having a free radical moiety; b) providing a first set of vinyl-functionalized oxazolone compounds and a second set of second monomers; c) generating an extended reactive polymer species by repeatedly i) reacting the reactive polymer propagating species with a member of the first set of vinyl-functionalized oxazolone compounds, ii) coupling the product thereof to a nitroxide capping compound to form an intermediary dormant polymer species; iii) dissociating the nitroxide capping compound from the intermediary dormant polymer species, thereby regenerating the extended reactive polymer propagating species; and iv) repeating the reacting, coupling, and dissociating steps using additional members of the first set of vinyl-functionalized oxazolone monomers; d) removing any unreacted members of the first set of vinyl-functionalized oxazolone compounds; e) providing a second set of second monomers; and f) repeating the reacting, coupling, and dissociating steps with members of the second set of second monomers, thereby synthesizing the oxazolone-containing block copolymer via a nitroxide-mediated controlled living free radical polymerization reaction. Optionally, the second set of second monomers is provided prior to the first set of oxazolone monomers.

The present invention also provides compositions as prepared by the present invention. In some embodiments, the polymers (homopolymers or copolymers) of the present invention are further functionalized by reaction with an active agent, to form an active agent-polymer conjugate. For example, the polymer can be reacted with a nucleophilic compound, such as an amine-functionalized active agent or a hydroxyl-containing (alcohol-functionalized) active agent, via standard chemical procedures.

The molar ratio of active agent to polymer can vary based upon the size of the polymer and intended use, e.g., ranging from 100:1 to 1:1 (agent:polymer). For example, for a composition employing an active agent of 500 Da and having a agent:polymer ratio of 20:1, a starting polymer of 15,000–25,000 Da will generate, through the methods of the present invention, an agent-polymer conjugate having a molecular weight ranging between 25,000 to 35,000 Da.

The active agents considered for conjugation in the present invention include, but are not limited to, various therapeutic agents, contrast agents, diagnostic agents, and/or targeting agents. In a preferred embodiment, the active agent is coupled to the polymer through a cleavable linkage moiety (for example, an enzymatically-cleavable linkage).

DEFINITIONS

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a surface" includes a combination of two or more surfaces; reference to "bacteria" includes mixtures of bacteria, and the like.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used in accordance with the definitions set out below.

As used herein, the term "oxazolone-containing polymer" refers to either homopolymers or copolymers having incorporated therein at least one oxazolone ("azlactone") monomer subunit.

As used herein, the abbreviation "Mw" refers to the weight average molecular weight, while the abbreviation "Mn" refers to the number average molecular weight.

The phrase "degree of polymerization" (DP) refers to the number of monomer units in a given (i.e., single) polymer chain; for mixtures of polymer chains, the DP value can be provided as either a weight average DP or a number average DP.

The term "polydispersity" as used herein refers the ratio of the number average molecular weight (Mn) to the weight average molecular weight (Mw) and represents the extent or broadness of a molecular weight distribution in a sample. For polymers in which the Mn equals Mw, the polydispersity is equal to 1 and the polymer is said to be "monodisperse."

As used herein, the term "macroinitiator" refers to a polymeric structure used as an initiator in a polymerization reaction, reflecting the larger-than-typical scale of the initiator compound used in the reaction.

The term "active agent" refers to a compound capable of interacting with a selected or desired substrate or ligand, either in the polymer-conjugated form or as a released derivative. Furthermore, the term "active agent" as used herein is meant to encompass the active form of a given molecule as well as any corresponding yet-to-be-activated forms (such as prodrugs and the like). The interactions between active agent and substrate or ligand include, but are not limited to, a binding activity, a chemical activity, a biochemical activity, and/or an enzymatic activity.

DETAILED DESCRIPTION

Figure 1:
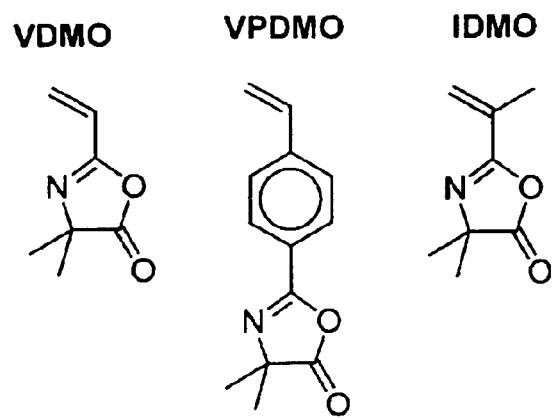
FIG. 1 provides exemplary vinyl-functionalized oxazolone monomers for use in the methods of the present invention.

The present invention provides for the synthesis of amine-reactive poly(vinyl oxazolones) as homopolymers or as copolymers, via a nitroxide-mediated living free radical polymerization (LFRP) process. The oxazolone-containing polymers can optionally be further functionalized to include active agents or other selected chemical substituents.

General Review of Free Radical Polymerization

One of the key issues in polymer synthesis has been the control of the physical attributes of the polymeric product, such as molecular weight, polydispersity, and/or polymeric architecture. Living free radical polymerization (LFRP) was initially developed in the early 1980's as a chemical mechanism for the controlled polymerization of vinyl monomers (see, for example, Moad et al. (1982) "Selectivity of the reaction of free radicals with styrene" *Macromolecules* 15:909–914). Three common approaches to LFRP include atom transfer radical polymerization (ATRP), reversible addition fragmentation chain transfer (RAFT), and nitroxide-mediated polymerization (NMP). ATRP and RAFT make use of transition metal species or reversible chain transfer agents, respectively, as the capping agents to mediate the living free radical reaction. The present invention preferably utilizes the nitroxide-mediated polymerization approach to LFRP in the synthesis of oxazolone-containing polymers.

Nitroxide-mediated LFRP

The nitroxide-mediated living free radical polymerization reaction employs a stable free radical nitroxide compound as the capping agent during propagation of the polymer. The free radical of the propagating species interacts with a given monomer, thus extending the polymer; between monomer interactions, the propagating species reversibly interacts with the capping compounds to form a dormant intermediate species. Thus, the polymerization reaction proceeds in a series of activation-deactivation reactions, during which the polymer chain is propagated by the addition of a single monomer in the activated phase, and unreactive in the "dormant", or deactivated phase. Polymer synthesis is controlled by retaining a large percentage of the growing reactive chains in the dormant state, thereby reducing the concentration of available propagating species.

Thus, nitroxide-mediated LFRP provides a mechanism by which the polymer growth can be directed while maintaining precise control of the physical attributes of the polymer. After initiating the polymer synthesis (via a short initial reaction period to generate the propagating species), the polymer chains grow homogeneously during the repeated activation-deactivation reactions, thereby generating a polymeric product having a very narrow molecular weight distribution. This is in contrast to classical free-radical polymerization, in which the radical-based reactions proceed uncontrolled (e.g., un-"capped") until polymer synthesis is terminated. Termination is often due to the unintentional reaction between two propagating polymer chains, thereby ceasing the radical-based extension reaction for both chains. Typically, the classical free radical reactions occur over very short chain lifetimes, a lead to products having a wide molecular weight distribution. Thus, the major limitations of the classical radical polymerization approach are the broad polydispersities and the uncontrolled polymer architectures of the resulting polymeric products.

In contrast, LFRP can be employed to controllably generate specific polymeric architectures having defined polydispersities. These polymerization protocols can be used to generate either linear structures as well as various copolymer architectures, such as block copolymers and/or star copolymers. Furthermore, LFRP reaction conditions are compatible with a variety of functional groups not normally accessible by classical free radical chemistry. Thus, the LFRP approach to polymer syntheses provides relative reaction ease/simplicity, compatibility with a variety of reaction conditions, and the ability to control desired the physical characteristics of the polymeric product, such as polydispersity, polymer architecture, and molecular weight.

Methods of the Present Invention

In one embodiment of the present invention, methods for the synthesis of oxazolone-based homopolymers are provided. In other related embodiments, methods for the synthesis of various types of oxazolone copolymers (e.g., random or "statistical" copolymers, block copolymers, and the like) are provided. In addition, the present invention provides methods for the synthesis of oxazolone-based polymers conjugated to active agents. The polymer synthesis methods for all of these embodiments proceed via similar steps whether generating a homopolymer or copolymer. The method embodiments primarily differ in a) the percentage of the optional second monomer component employed in the method steps (the absence of which corresponds to homopolymer synthesis), and b) the timing of the addition of the sets of monomers—for example, whether the two sets of monomeric units are present concurrently (e.g. random/ statistical copolymer synthesis) or during different series of repeat cycles during the synthesis (e.g. block copolymer synthesis). The compositions and methods of the present invention are further detailed in Tully et al. (2003) "Synthesis of Reactive Poly(vinyl oxazolones) via Nitroxide-Mediated 'Living' Free Radical Polymerization" *Macromolecules* 36:4302–4308, the contents of which are incorporated in their entirety herein.

The LFRP-based synthesis methods of the present invention typically include the steps of a) providing a desired monomer or plurality of monomers; b) providing a reactive polymer propagating species having a free radical moiety; c) reacting the reactive polymer propagating species with a member of the plurality of monomers, thereby producing an extended reactive polymer propagating species; d) coupling a nitroxide capping compound with the extended reactive polymer propagating species and forming an intermediary dormant polymer species; e) dissociating the nitroxide capping compound from the intermediary dormant polymer species, thereby regenerating the extended reactive polymer propagating species; and f) repeating the reacting, coupling, and dissociating steps with additional member monomers. The components involved in each of these steps are described in greater detail below.

Monomers

The methods of the present invention include the step of reacting a reactive polymer propagating species with a first monomer to generate an extended reactive polymer species. The monomer can be selected from a set of oxazolone monomers (e.g., during the synthesis of an oxazolone homopolymer), or the monomer can be a member of a plurality of monomers comprising a first set of vinyl-functionalized oxazolone compounds and a second set of second monomers (e.g. during synthesis of a copolymer). The first and second sets of monomers need not be provided at the same moment during the reaction (e.g., as seen during the synthesis of a block copolymer).

Any of a number of oxazolone monomers is available for use in the polymer synthesis methods of the present invention. Exemplary oxazolone monomers include, but are not limited to, the following compounds:

| | |
|---|---|
| 2-vinyl-4,4-dimethyl-5-oxazolone (VDMO) | CAS Registry 29513-26-6 |
| 2-(4'-vinyl)-phenyl-4,4-dimethyl-5-oxazolone (VPDMO) | CAS Registry 137349-06-5 |
| 2-isopropenyl-4,4-dimethyl-5-oxazolone (IPMO) | CAS Registry 15926-34-8 |
| 2-vinyl-3-oxa-1-azaspiro[4.5]dec-1-en-4-one | CAS Registry 18500-18-0 |
| 2-vinyl-4,4-diethyl-5(4H)-oxazolone | CAS Registry 129884-20-4 |
| 2-vinyl-3-oxa-1-azaspiro[4.4]non-1-en-4-one | CAS Registry 81094-93-1 |
| 2-vinyl-4,4-dibutyl-5(4H)-oxazolone | CAS Registry 159439-90-4 |
| 2-vinyl-4-ethyl-4-methyl-5(4H)-oxazolone | CAS Registry 24537-88-0 |
| 4-methyl-4-propyl-2-vinyl-2-oxazolin-5-one | CAS Registry 19294-21-4 |
| 2-vinyl-4-methyl-4-phenyl-5(4H)-oxazolone | CAS Registry 18500-21-5 |

Furthermore, either homogeneous pools of a single oxazolone monomer, or combinations of two or more oxazolone monomers, can be used to provide the oxazolone monomer and generate the polymers of the present invention.

For those embodiments in which a second monomer is used, a number of additional (non-oxazolone type) monomers are contemplated for use in the present invention, including, but not limited to, styrene, substituted styrene, alkyl acrylate, substituted alkyl acrylate, alkyl methacrylate, substituted alkyl methacrylate, acrylic acid, methacrylic acid, acrylonitrile, methacrylonitrile, acrylamide, N-alkylacrylamide, N-alkylmethacrylamide, N,N-dialkylacrylamide, N,N-dialkylmethacrylamide, isoprene, butadiene, ethylene, vinyl acetate, vinylidene chloride, vinylidene fluoride, vinyl chloride, vinyl fluoride, tetrafluoroethylene, 4-vinyl pyridine, 3-vinyl pyridine, 2-vinyl pyridine, and/or N-vinyl amides. Furthermore, combinations of two or more of these monomeric subunits can also be employed in the provided methods. Exemplary monomers are further described in, for example, PCT publication WO 02/056021 by Klaerner et al. ("Polymer brushes for immobilizing molecules to a surface or substrate having improved stability") and references cited therein.

Reactive Polymer Species

The polymers prepared by the methods of the present invention can be initiated either by using a selected monomer, or by using a reactive end of a growing polymer. In one embodiment of the present invention, providing the reactive polymer propagating species comprises a) providing a first monomer; b) providing an alkoxyamine compound capable of dissociating into a first nitroxide portion and a second free radical portion; and c) reacting the second free radical portion of the dissociated alkoxyamine compound with the first monomer, thereby forming a reactive polymer propagating species. The monomer can be selected from either the pool of oxazolone monomers, or from the second set of second monomers, depending upon the type (homopolymer versus copolymer) and architecture (random polymer versus block copolymer) of the desired product. In an alternate embodiment, the polymer is initiated using an oligomeric structure (e.g., a partially polymerized chain having a length less than the desired length of the polymer). As would be obvious to one of skill in the art, a product of a previous polymerization reaction is also contemplated as a substrate for the methods of the present invention. For such an embodiment, the method steps would include: a) providing a portion of a polymer; b) providing an alkoxyamine compound capable of dissociating into a first nitroxide portion and a second free radical portion; and c) reacting the second free radical portion of the dissociated alkoxyamine compound with the potion of the polymer, thereby forming a reactive polymer propagating species. Typically, the polymer portion selected for activation is a terminus of the polymer.

Alkoxyamines

The methods of the present invention preferably employ alkoxyamines for the initiation and/or propagation of the living free radical polymerization reaction (e.g., as initiator/control agents; see, for example, Hawker et al.(2001) *Chem. Rev.* 101:3661–3688 and references cited therein. Alkoxyamine compound can be dissociated into two components (the first nitroxide portion and the second free radical portion), either or both of which can be used during the LFRP reaction. The second free radical portion functions to provide the free radical necessary to initiate the polymerization reaction, thereby generating a reactive monomer (or nascent polymer). Optionally, the first nitroxide portion of the alkoxyamine compound is further employed as the nitroxide capping compound in the coupling step.

Two exemplary alkoxyamine compounds which can be used in the present methods are N-(1,1-dimethylethyl)-α-(1-methylethyl)-N-(1-phenylethoxy)-benzenemethanamine (CAS Registry 227000-59-1) and 2,2,6,6-tetramethyl-1-(1-phenylethoxy)-piperidine (CAS Registry 154554-67-311). Typically, an alkoxyamine compound having the formula

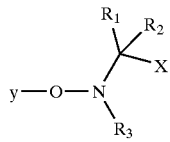

can be employed in the methods of the present invention, wherein Y is the second free radical portion of the alkoxyamine, X represents a chemical moiety that destabilizes the Y—O bond (facilitating generation of the first nitroxide portion and the second free radical portion), and R1, R2 and R3 independently comprise a hydrocarbon, a substituted hydrocarbon moiety (e.g., an alkyl, aryl, cycloalkyl group) or a heteroatom-containing moiety (e.g., an amino, boryl, phosphino, seleno, silyl, or thio-containing moiety). Exemplary compositions are provided, for example, in U.S. Pat. No. 4,581,429 to Solomon et al. ("Polymerization process and polymers produced thereby"), and in PCT publications WO 96/24620 by Grimaldi et al. ("Polymerization in the presence of a β-substituted nitroxide radical"); WO98/30601 by Anderson et al. (Method of controlling polymer molecular weight and structure"); WO 99/03894 by Nesvadba et al. ("Polymerizable compositions containing alkoxyamine compounds derived from nitroso- or nitrone compounds") and WO 02/056021, supra.

Optionally, the polymerization reaction is performed in the presence of an excess of free nitroxide. For example, in addition to the alkoxyamine compound(s), the reaction solution optionally includes 1%, 2%, 3%, 4%, or 5% additional free nitroxide (molar concentration as compared to alkoxyamine). The excess free nitroxide can be the same chemical entity as the first nitroxide component of the dissociated alkoxyamine compound, or it can have a different chemical structure.

Nitroxide Capping Compounds

The reactive polymer propagating species (initial monomer or growing polymer chain) undergoes living free radical polymerization with a member of the plurality of monomers, thereby producing an extended reactive polymer propagating species. During this process, the free radical portion of the propagating species interacts with the selected monomer, during which the free radical is propagated to the new terminus of the extended reactive polymer propagating species. The extended polymer is then capped with a nitroxide capping compound, thereby generating an intermediary dormant species characteristic of the LFRP reaction.

Any nitroxide compound known to one of skill in the art can be employed as the nitroxide capping compound in the methods of the present invention. Preferably, the nitroxide capping compound comprises a nitrosyl compound having an α-secondary carbon (see Hawker et al., supra.) Exemplary nitroxide capping compounds for use in the present methods include, but are not limited to, 1,1-dimethylethyl 2-methyl-1-phenylpropyl nitroxide (CAS Registry 61015-94-9) and 2,2,6,6-tetramethyl-1-Piperidinyloxy ("TEMPO", CAS Registry 2564-83-2). However, any nitroxide generated from an alkoxyamine described herein, and/or any nitroxide having the general chemical structure $R_1R_2NO$ can be used in the methods of the present invention.

During the polymerization reaction, the reactive terminus of the polymer is deactivated by coupling with the nitroxide capping compound, then re-activated by dissociation of the nitroxide capping compound from the intermediary dormant species. A reactive propagating species is thus regenerated, in a form extended by one monomeric unit as compared to the previous iteration (e.g., an extended reactive polymer propagating species), and is ready to undergo another addition cycle. The repeated cycles of reacting, coupling, and dissociating steps with additional monomers (either oxazolone or otherwise) ultimately leads to the synthesis of the oxazolone-containing polymer, via the described nitroxide-mediated controlled living free radical polymerization reaction. Optionally, the polymer so generated will have a polydispersity of less than or equal to 1.20, and preferably a polydispersity of $\leq 1.15$, or more preferably $\leq 1.10$ (as determined, for example, by size exclusion chromatography).

Optionally, a polymer product of the present invention has a weight average molecular weight falling within the range of between approximately 10,000 Da and 100,000 Da, depending upon various factors such as the selected monomer compositions and extent of polymerization. In some embodiments, the polymer products have molecular weights in the range between approximately 10,000 Da and 50,000 Da, or between approximately 25,000 Da and 35,000 Da. Alternatively, the molecular weight of the polymer of the present invention can range between approximately 50,000 Da and 100,000 Da in size (e.g., a high molecular weight polymer).

For the synthesis of copolymers (either block or random), the composition of the product polymer will depend upon the ratio of oxazolone and non-oxazolone monomers used, as well as the timing of their addition to the reaction mixture. In one embodiment of the present invention, the plurality of monomers comprises 50% vinyl-functionalized oxazolone compounds and 50% second monomers (i.e., a 50:50 ratio). In an alternate embodiment, the plurality of monomers comprises 90% vinyl-functionalized oxazolone compounds and 10% second monomers. In yet another embodiment, the plurality of monomers comprises 10% vinyl-functionalized oxazolone compounds and 90% second monomers. Further ratios of first to second monomer are also contemplated, such as 20:80, 25:75, 40:60, 60:40, 75:25, and 80:20, and will depend in part upon the intended use of the product polymer.

The LFRP reaction can be repeated as many times as necessary to produce the desired polymeric product having a low polydispersity, as determined by any of a number of methods known to one of skill in the art. Exemplary methods for determination of polydispersity include, but are not limited to, size exclusion chromatography, gel permeation chromatography, laser light scattering, and the like. In a preferred embodiment, polydispersity is determined by a combination of size exclusion chromatography/gel permeation chromatography techniques (SEC/GPC). However, any method capable of providing the molecular weights Mn and Mw of a polymer can be used. Optionally, the polymer so generated will have a polydispersity of less than or equal to 1.20, and preferably a polydispersity of $\leq 1.15$, or more preferably $\leq 1.10$ as determined, for example, by SEC/GPC.

Reaction temperatures for performing the LFRP reaction typically range between 100–130° C. Optionally, the reaction can be performed at temperatures ranging from 120–125° C., or for some embodiments, the reaction temperature can be held at 123° C. The length of the reaction will depend in part upon the dissociation rate of the capping compound the temperature of the reaction, and the length of the desired polymeric product. Typically, the methods of the present invention are performed for between one and 24 hours; preferably, the reaction is sustained for between 4 and 16 hours. In a preferred embodiment (such as some embodiments provided in the Examples section herein), the polymerization reaction is complete after 4 hours.

Optionally, the polymer products undergo further purification after the LFRP reaction (e.g., the series of repeated reacting, coupling and dissociating steps) is completed. For example, the polymer can be dissolved in a first solvent (e.g., chloroform), and then precipitated using a second solvent (e.g., hexanes). Optionally, the product polymer can be filtered, washed, and/or dried. Such procedures are common to a variety of polymer synthesis techniques, the necessity of which can easily be determined by one of skill in the art.

Polymer Products and Conjugated Polymer Products

The present invention also provides oxazolone-containing homopolymers and copolymers as prepared by the methods of the present invention. Preferably, the oxazolone-containing polymer has a polydispersity of less than or equal to 1.20 as determined by methodologies typically employed in polymer analysis (e.g., SEC/GPC). Optionally, the polydispersity of the product polymer is less than or equal to 1.15, or even less than or equal to 1.10. The weight average molecular weight of the polymer product will depend upon the selected composition and can optionally range in value between approximately 10,000 Da and 100,000 Da. For example, the oxazolone-containing polymers of the present invention can optionally be prepared wherein the polymer has a polydispersity of less than or equal to 1.20 and a weight average molecular weight greater than about 5000 Da. In some embodiments of the present invention, the homopolymer or copolymer has a weight average molecular weight greater than about 10,000 Da and less than about 50,000 Da. In alternate embodiments, the homopolymer or copolymer has a weight average molecular weight greater than about 50,000 Da and less than about 100,000 Da. In some embodiments, the homopolymer or copolymer has a weight average molecular weight greater than about 25,000 Da and less than about 35,000 Da.

The present invention also provides compositions of the active agent:polymer conjugates as prepared by the methods described herein. The compositions can be used, for example, as pharmaceutical formulations (e.g., for active agents having a therapeutic action), or as contrast agent formulations. Typically, the active agent is covalently coupled to the polymer. In a preferred embodiment, the active agent is coupled to the polymer via a cleavable linker.

The polymers prepared by the methods of the present invention can be used for a number of purposes, including, but not limited to, the preparation of polymer-conjugated active agents (such as drug formations or diagnostic agents), or surface-grafted polymer multilayers (e.g., for the covalent immobilization of proteins and peptides to chemically modified surfaces).

Active Agent:Polymer Conjugates

The methods of the present invention can optionally be used to prepared oxazolone-containing polymers (e.g., homopolymers, random copolymers, block copolymers, etc.) coupled to a biologically-active agent such as a therapeutic agent or drug compound (see, for example, FIG. 8). For these embodiments, the methods for preparing oxazolone-containing polymers further include the steps of a) providing a functionalized active agent; and b) conjugating the functionalized active agent to the oxazolone-containing polymer, thereby synthesizing an active agent-conjugated oxazolone-containing polymer via a nitroxide-mediated controlled living free radical polymerization reaction. The agent-polymer conjugate can be prepared from either an oxazolone homopolymer or an oxazolone-containing copolymer.

Any of a number of active agents (e.g., compounds of interest) can be coupled or conjugated to the oxazolone-containing polymers of the present invention, the selection of which will depend, in part, upon the presence of (or amenability to modification to include) a reactive functionality, as well as the intended use of the conjugated polymer. Optionally, a selected active agent of interest is chemically altered for use in the polymer synthesis methods. For example, in some cases the active agent is modified to incorporate a reactive amine or hydroxyl group, in order to facilitate the conjugation reaction. Active agents for use in the present invention include, e.g., therapeutic agents, contrast agents, diagnostic agents, targeting agents, and the like.

Exemplary biologically-active agents contemplated for use in the present invention include, but are not limited to, various prescription and over-the-counter medications, therapeutic proteins and/or peptides, ACE inhibitors; analgesics and analgesic combinations; local and systemic anesthetics; antihistamines; anti-inflammatory agents; anti-asthmatic agents; anticoagulants, antidiabetic agents; anti-infectives (including but not limited to antibacterials, antibiotics, antifungals, antihelminthics, antimalarials and antiviral agents); antioxidants; cardiac and/or cardiovascular preparations (including angina and hypertension medications, anti-arrhythmic agents, cardiotonics, and cardiac depressants); calcium channel blockers and/or beta blockers; vasodilators; vasoconstrictors; contraceptives, hormones steroids, growth factors, and the like; chemotherapies, including various antineoplastics; decongestants; vitamins, herbal preparations and active component isolates; muscle relaxants; immunoreactive compounds, such as immunizing agents, immunomodulators, and immunosuppressives; neurologically-active agents including Alzheimers and Parkinsons disease medications; migraine medications; adrenergic receptor agonists and antagonists; cholinergic receptor agonists and antagonists; anti-anxiety preparations, anxiolytics, anticonvulsants, antidepressants, anti-epileptics, antipsycotics, antispasmodics, psychostimulants, hypnotics, sedatives and tranquilizers; various combinations of these compounds, and the like.

The "active agents" of the present invention need not have a biological activity (for example, have an enzymatic activity, or be capable of undergoing a biochemical reaction) for consideration and use in the oxazolone polymers described herein; compounds having novel physical properties (e.g., binding affinities, label characteristics) are also contemplated as "active agents." The methods of the present invention can be used to prepared oxazolone-containing polymers coupled to additional active agents of interest, such as contrast agents, diagnostic agents, targeting agents and the like. Exemplary contrast agents which can be coupled to the oxazolone-containing polymers of the present invention include, but are not limited to, MRI contrast agents, X-ray contrast agents, PET contrast agents, CT contrast agents, ultrasonography contrast agents. In addition, diagnostic agents such as various fluorescent probes, chromophores, labeled nucleic acids, and/or radioisotopes can be conjugated to the polymer. Furthermore, imaging agents such as tyrosinamide, or targeting agents (e.g. biotin, avidin, various lectins, and the like) can also be conjugated to the polymers described herein. Moreover, a combination of these (and other) active agents is contemplated in the present invention.

Figure 3:
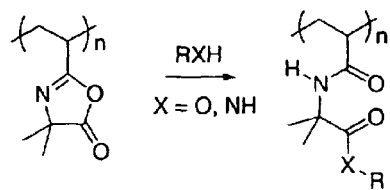
FIG. 3 provides an exemplary synthesis scheme for production of an oxazolone-containing homopolymer.

While any of a number of reactions known to one of skill in the art are contemplated for use in the conjugation process, two simple chemical reactions are notably considered and readily available for complexation of active agents to the product polymer. For example, poly(oxazolones) react readily with amines at room temperature to produce the corresponding poly(acrylamides), as depicted in FIG. 3. Alternatively, the polymer can be reacted with alcohols in the presence of base to afford ester functionalized poly (acrylamides). This approach to polymer modification, via a ring-opening addition reaction, is particularly attractive from a synthesis point of view, since the reaction proceeds without the addition of any external reagents and without the production of condensation byproducts, thereby greatly simplifying purification of the polymer-agent conjugate.

Typically, the active agent is covalently coupled to the polymer. In a preferred embodiment, the active agent is coupled to the polymer via a cleavable linker. Exemplary cleavable linkers for use in the present invention include peptide linkers presenting enzymatic cleavage sites, such as those described in PCT publication WO 98/19705 to King et al. ("Preparation of branched peptide linkers").

The polymer with its conjugated active agent can be applied or administered to an organism or a patient by any of a number of mechanisms known in the art. Most commonly, a soluble polymer-active agent conjugate is administered as an oral formulation or an intravenous formulation; however, a solid formulation of the conjugated polymer (such as a tablet or capsule) or an aerosolized formulation is also contemplated herein. Optionally, one or more excipients is also included with the conjugated polymer, such as conventional nontoxic binders, disintegrants, flavorings, and carriers (e.g., pharmaceutical grades of mannitol, lactose, starch, magnesium stearate, sodium saccharine, talcum, cellulose, glucose, sucrose, magnesium, carbonate, and the like). Exemplary excipients are provided, for example, in Remington's *Pharmaceutical Science*, 17th ed. (Mack Publishing Company, Easton, Pa., 1985).

This facile polymer modification reaction provides a versatile and attractive mechanism for introducing a wide variety of functionalities (e.g., active agents or other chemical moieties) into the polymer structure without having to prepare and then orchestrate the polymerization of individually-modified monomers. This approach is particularly attractive for the synthesis of conjugated copolymers, for which multiple modified monomers must be coordinated. In addition, post-synthesis modification of the polymer to form the desired conjugated product avoids potential difficulties which might arise during the polymer synthesis reactions. For example, the chemical functionalities to be introduced into the product polymer may not be compatible with the polymerization conditions, or solubility problems could arise during the polymerization reaction. It is not uncommon for one or more members of the plurality of monomers to be immiscible in the polymerization medium, or for the growing polymer chain to become insoluble in its monomer solution. Thus, the preparation of soluble polymer conjugates of active agents such as biological molecules (e.g., peptides and proteins) is more conveniently accomplished through the post-polymerization functionalization of a reactive polymer, rather than by the copolymerization of active agent-functionalized macromonomers.

One goal of administering an active agent-polymer conjugate (rather than the agent alone) is to increase the half-life of the active agent in an organism. In these (and other) embodiments of the present invention, the active agent is optionally coupled to the oxazolone-containing polymer by a cleavable linker, such that the active agent can be release from the polymer during the administration. One preferred type of linker is an enzymatically-cleavable linker, such as an oligopeptide or an oligosaccharide. The cleavable linker is at least two units (e.g., amino acids, sugars, or other repeating units) in length, and can include as many as 5, 10, 20 or even more repeating units. Optionally, the oligopeptide or oligosaccharide provides a cleavage site (e.g., the amide bond or glycosidic linkage) recognized by a specific lyase (e.g., protease or glycosidase), present at a target location within the organism. Exemplary cleavable linkers are described, for example, in PCT publications WO 98/56424 and WO 98/56425 by Duncan et al. ("Biologically Active Materials" and "Pharmaceutical Compositions containing Antibody-Enzyme Conjugates in Combination with Prodrugs"), as well as in WO 98/19705 to King et al, supra.

Surface-bound Conjugated Polymers

In another embodiment, the oxazolone-containing polymers of the present invention are grafted onto amino-functionalized surfaces to provide an amine reactive functional polymer film. The polymer film thus formed can be used, for example, for the covalent immobilization of a number of chemical or biochemical compositions, such as proteins or peptides, nucleic acids (DNA or RNA), antigens, antibodies, ligands, and the like. Preferably, the polymer is conjugated to the active agent prior to coupling to a reactive surface; however, the conjugation reaction can optionally be performed after deposition of the polymer onto the selected surface.

The surface-grafted oxazolone polymer multilayers can be prepared as follows. An aminoalkyl-functionalized substrate is provided (e.g., silanized glass, silicon wafers, quartz, a silicate surface modified with an amino-functionalized organic coating, or any amine-functionalized organic surface). The amino-alkyl functionalized substrate is immersed into a solution (e.g., 5 mg/ml) of the oxazolone-containing polymer of the present invention prepared in an appropriate solvent (for example, DMF, DMAc, NMP, DMSO, $CHCl_3$, dioxane, toluene, THF, acetone, ethyl acetate, MTBE, glymes, etc.) with 1% amine base (Et3N, i-Pr2NEt, 2,6-Lutidine, Pyridine, DBU, DABCO, DMAP, etc.) for approximately 18 hours at room temperature. The substrates are washed with solvent to remove any unreacted polymer and dried with a nitrogen stream.

The substrate-bound oxazolone-containing polymers of the present invention can be used for a number of functions. For example, in a further embodiment, the polymers of the present invention can be used to generate antigen-polymer conjugates and/or antibody-polymer conjugates for use, for example, in diagnostic devices. Antigens related to a variety of bacteria, viruses and/or parasites, or antibodies generated against one or more antigens (e.g., during an immune response to one of these organisms), can optionally be conjugated to the polymers of the present invention. For example, prokaryotic systems which could be detected using a surface-bound polymer-antigen (or antibody) conjugate include, but are not limited to, *Bacillus, Chlamydia, Escherichia, Helicobacter, Heliobacterium, Haemophillus, Mycobacterium, Mycoplasma, Rickettsia*, and *Trypanosoma* (See, for example, the lists of microorganism genera provided by DSMZ-Deutsche Sammlung von Mikroorganismen und Zellkulturen GmbH, Braunschweig, Germany, at www.dsmz.de/species). Detectable viral systems include, but are not limited to, adenoviruses; coronaviruses; various strains of hepatitis; herpes viruses; influenza and parainfluenza viruses; papova viruses such as SV40, polyoma and papilloma viruses; pox viruses; polio and other picorna viruses (including enteroviruses and rhinoviruses); rhabdoviruses (rabies); rubella and other togaviruses; as well as various oncogenic viruses, such as Epstein-Barr virus, herpes simplex virus, cytomegalovirus, sarcoma viruses, and the like. (See Dulbecco and Ginsberg *Virology* (reprinted from Davis, Dulbecco, Eisen and Ginsberg's *Microbiology*, third edition (1980) Harper and Row, Philadelphia, Pa.).

Kits

In another embodiment, this invention provides kits for practice of the methods of the present invention as described herein. The kits typically include one or more oxazolone monomers, and at least one initiator compound, (e.g., an alkoxyamine compound capable of dissociating into a first nitroxide portion and a second free radical portion, or a precursor thereof). Optionally, the kits also provide at least one nitroxide capping compound (e.g., for use during the formation of an intermediary dormant polymer species).

In some embodiments, the kits of the present invention a plurality of monomers for use in the synthesis of oxazolone-containing polymers. For example, the kits can optionally include a first set of vinyl-functionalized oxazolone monomers and a second set of second (non-oxazolone) monomers, as described herein. Exemplary second monomers include, but are not limited to, styrene, substituted styrene, alkyl acrylate, substituted alkyl acrylate, alkyl methacrylate, substituted alkyl methacrylate, acrylic acid, methacrylic acid, acrylonitrile, methacrylonitrile, acrylamide, N-alkylacrylamide, N-alkylmethacrylamide, N,N-dialkylacrylamide, N,N-dialkylmethacrylamide, isoprene, butadiene, ethylene, vinyl acetate, vinylidene chloride, vinylidene fluoride, vinyl chloride, vinyl fluoride, tetrafluoroethylene, 4-vinyl pyridine, 3-vinyl pyridine, 2-vinyl pyridine, N-vinyl amides, and the like.

In some embodiments, the kits of the present invention also provide one or more amine-functionalized agents and/or one or more hydroxyl-containing agents to be conjugated to the oxazolone-containing polymer. Exemplary agents for coupling include, but are not limited to, therapeutic agents, contrast agents, diagnostic agents and/or targeting agents having (or modified to incorporate) the appropriate functionalization moiety for coupling to the oxazolone-containing polymer.

The kits of the present invention can additionally include any of the other components described herein for the practice of the methods of this invention. Such materials can include, but are not limited to, various solvents, buffers, chromatographic matrices, and the like.

The kits may optionally include instructional materials containing directions (i.e., protocols) disclosing the synthesis methods described herein. While the instructional materials typically comprise written or printed materials, they are not limited to such, and can also (or alternatively) include electronic storage media (e.g., magnetic discs, tapes, cartridges, chips), optical media (e.g., CD ROM), or other media capable of storing such instructions and communicating them to an end user. Such media may include addresses to internet sites that provide such instructional materials.

EXAMPLES

The following examples are offered to illustrate, but not to limit the claimed invention. It is understood that the examples and embodiments described herein are for illustrative purposes only and that various modifications or changes in light thereof will be suggested to persons skilled in the art and are to be included within the spirit and purview of this application and scope of the appended claims.

There have been several reports regarding the traditional free radical copolymerization of VDMO using azo-initiators (see, for example, Taylor et al. (1971) *Polymer Lett.* 9:187–190; Taylor et al. Makromol. Chem. Rapid Commun. 1982, 3, 779–782; and Heilmann et al. (2001) *J. Polym. Sci. Part A: Polym. Chem.* 39:3655–3677 and references therein). Experimentally-determined reactivity ratios for the copolymerization parameters of VDMO have also been reported (Muthiah and Mathias (1991) *J. Polym. Sci. Part A: Polym. Chem.* 29:29–37; Fazio et al. (1992) *J. Poly. Sci. Part A: Poly. Chem.* 30:329–331; and Rasmussen et al. (1988) in *Encyclopedia of Polymer Science and Engineering* (2nd Edition) pp. 558–571 and references therein).

The synthesis of random copolymers by living free radical processes is a more attractive and convenient method for random copolymer synthesis, especially in terms of preserving homogeneity on the microscopic level of individual polymer chains. Since all chains initiate at approximately the same time and propagate at approximately the same rate, all chains experience the same monomer feed. The resulting copolymer product is homogeneous both with respect to molecular weight and to monomer composition among individual polymer chains. We have found that VDMO can be polymerized with accurate molecular weight control and polydispersities at or below 1.10 by nitroxide mediated living radical polymerization. In the present invention, we have provided for the homopolymerization of VDMO and VPDMO and their copolymerization with a variety of different monomers, in addition to the preparation of reactive block copolymers with narrow polydispersities.

Nitroxide 1, alkoxyamine 2, VPDMO and IPMO were synthesized according to previously published procedures (see Benoit et al. (1999) *J. Am. Chem. Soc.* 121:3904–3920; Fazio et al. (1992) *J. Poly. Sci. Part A: Poly. Chem.* 30:329–331; Iwakura et al. (1966) *J. Polym. Sci., Part A-1* 4:2649–2657; and Iwakura et al (1968) *J. Polym. Sci., Part A-1* 4:2681–2686). VDMO (99%) was purchased from TCI-America (Portland, Oreg.) and distilled immediately prior to use. Styrene (99%), 4-acetoxystyrene (96%), methyl acrylate (99%), ethylene glycol methyl ether acrylate (98%), n-butyl acrylate (99+%), tert-butyl acrylate (98%), methyl methacrylate (99%), methacryloyl chloride (98+%), N,N-dimethylacrylamide (99%), 1-vinyl-2-pyrrolidinone (99+%), and acrylonitrile (99+%) were purchased from Sigma-Aldrich (Milwaukee, Wis.), each of which were distilled immediately prior to use. 4-Vinyl benzoic acid (97%) and α-aminoisobutyric acid (99%) were purchased from Fluka Chemical Corp (Milwaukee, Wis.) and used without further purification. 2-Pentadecyl-4,4-dimethyl-2-oxazolin-5-one (99%) was purchased from Lancaster Synthesis (Windham, N.H.) and used without further purification. Anhydrous grade solvents were purchased from Sigma-Aldrich (Milwaukee, Wis.) and used without further purification. A 0.1 M solution of nitroxide 1 in cyclohexane was prepared and used for a more accurate volumetric addition to the polymerization reactions.

Nuclear magnetic resonance spectroscopy was performed on a Bruker DPX Avance-400 in $CDCl_3$. Elemental analysis was performed by M-H-W Laboratories (Phoenix, Ariz.). Size exclusion chromatography (SEC) was carried out at ambient temperature using THF as eluent at a flow rate of 1.0 mL/minute on a system consisting of a K-501 pump (Knauer), a K-3800 Basic autosampler (Marathon), a set of two PLgel 5 μm mixed-D columns (300×7.5 μm) rated for linear separations for polymeric molecular weights from 200–400,000 Da (Polymer Laboratories), and a PL-ELS 1000 evaporative light scattering detector (Polymer Laboratories). Data were acquired through a PL Datastream unit (Polymer Laboratories) and analyzed with Cirrus GPC software (Polymer Laboratories) based upon a calibration curve built upon polystyrene standards with peak molecular weights ranging from 580–480,000 kg/mol (EasiCal PS-2, Polymer Laboratories).

Example 1

Bulk Homopolymerization of VDMO

Figure 2:
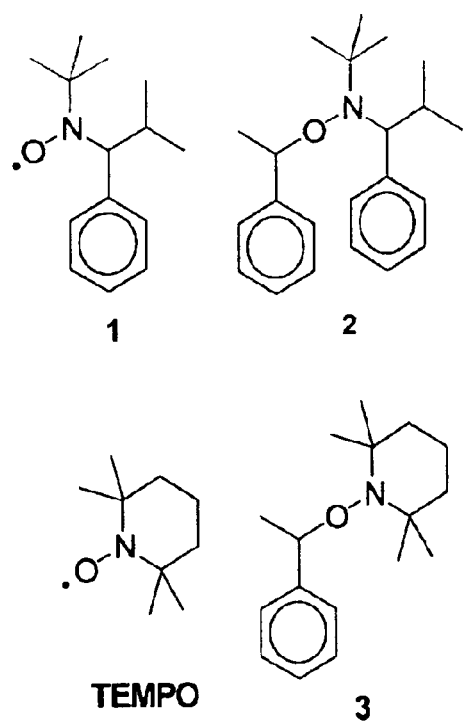
FIG. 2 provides exemplary nitroxide and alkoxyamines for use in the methods of the present invention.

We initially examined the bulk homopolymerization of VDMO (DP=250) and its dependence on both time and temperature, using nitroxide 1 and alkoxyamine 2 (FIG. 2) to explore the polymerization of vinyl-functionalized oxazolones, based in part upon exceptional versatility and relative ease of synthesis of these substrate compounds. A solution of VDMO (4.00 g, 29.0 mmol), alkoxyamine 2 (36.7 mg, 0.116 mmol) and nitroxide 1 (1.3 mg, 5.8 mmol) was degassed by three freeze/pump/thaw cycles and sealed under nitrogen. The solution was stirred at 123° C. for 12 h. The clear, solid plug was then dissolved in chloroform and precipitated into hexanes (2L). The fine, white precipitate was filtered, washed with additional hexanes, and dried under vacuum to give the desired poly(VDMO) as a very fine white powder (3.28 g, 81%). $M_n$=31.5 kDa, PD=1.04.

Using alkoxyamine 2 alone as unimolecular initiator, an appreciable degree of control is preserved throughout the course of the polymerization to high conversions upwards of 90%, with polydispersities around 1.15 (Table 1). Hawker and coworkers have previously shown that the addition of a slight excess of free nitroxide (approximately 5% relative to alkoxyamine) has a significant effect on the polymerization of acrylates, providing a much higher degree of control with polydispersities below 1.10 (Benoit et al. (1999) *J. Am. Chem. Soc.* 121:3904–3920). A similar effect is observed in the present invention with VDMO, as polydispersities of 1.02–1.09 were routinely achieved at very high conversions (ca. 90–95%.) with the addition of 5% free nitroxide 1 relative to alkoxyamine 2.

As conversions approach 100% at the longer reaction times (≧8 h), a slight high molecular weight shoulder with a molecular weight double that of the primary peak began to appear in the SEC trace. This presumably arises as a result of termination via chain-chain coupling, which is not surprising given the low glass transition temperature of poly (VDMO) ($T_g$=92° C.) relative to the temperature of the bulk polymerization (123° C.). A similar tendency was observed for the bulk nitroxide-mediated LFRP of polyisoprene (see Benoit et al. (2000) *Macromolecules* 33:363–370). This undesirable chain-chain coupling is easily avoided by either stopping the polymerization of VDMO when conversions of approximately 90–95% have been attained (e.g., in this embodiment, after approximately 4 hours), or by decreasing the temperature of the bulk polymerization. Several lower temperatures were examined down to 105° C. and a high degree of control was still preserved with polydispersities below 1.10 in each case (see Table 1). Although the time required to reach full conversion was increased considerably, no high molecular weight shoulder was observed in the GPC traces for bulk polymerizations of VDMO conducted at 115° C. or below.

TABLE 1

Bulk homopolymerization of VDMO and the dependence on time and temperature.

| Initiator | Temp (° C.) | Time (h) | Mn (kDa) | PDI |
|---|---|---|---|---|
| 2 only | 123° | 0.5 | 9.7 | 1.22 |
| | | 1 | 13.4 | 1.14 |
| | | 2 | 24.3 | 1.13 |
| | | 4 | 27.7 | 1.15 |
| | | 8 | 29.6 | 1.16 |
| | | 16 | 33.2 | 1.13 |
| 2 and 1 (5%) | 123° | 0.5 | 4.2 | 1.08 |
| | | 1 | 5.3 | 1.09 |
| | | 2 | 10.3 | 1.09 |
| | | 3 | 28.5 | 1.02 |
| | | 4 | 31.5 | 1.04 |
| | | 5 | 34.3 | 1.04 |
| | | 8 | 33.9 | 1.14 |
| | | 16 | 32.5 | 1.19 |
| 2 and 1 (5%) | 115° | 8 | 35.5 | 1.07 |
| 2 and 1 (5%) | 110° | 8 | 20.6 | 1.04 |
| | | 16 | 29.9 | 1.07 |
| | | 48 | 32.0 | 1.05 |
| 2 and 1 (5%) | 105° | 8 | 20.9 | 1.03 |
| | | 24 | 29.8 | 1.04 |
| | | 80 | 33.0 | 1.09 |

TABLE 1-continued

Bulk homopolymerization of VDMO and the dependence on time and temperature.

| Initiator | Temp (° C.) | Time (h) | Mn (kDa) | PDI |
|---|---|---|---|---|
| 3 only | 123° | 24 | 33.2 | 1.22 |
| 3 + TEMPO(5%) | 123° | 24 | 35.8 | 1.26 |

Ratio of VDMO:Alkoxyamine = 250:1 and 5% excess nitroxide relative to alkoxyamine.
Theoretical molecular weight = 34.5 kDa.

Example 2

Polymerization of VDMO Using Initiator 3

For comparison, bulk homopolymerization of VDMO was performed at 123° C. in the presence of TEMPO-derived unimolecular 3 (FIG. 2), both with and without excess TEMPO (5% relative to 3). At high conversions, there is a noticeably lesser degree of control compared to the polymerization with alkoxyamine 2, with polydispersities typically in the range of 1.20–1.30 (see Table 1). Interestingly, as the polymerization of VDMO in the presence of 3 approaches full conversion (both with and without excess TEMPO), no high molecular weight shoulder is observed in the SEC trace. However, the apparent absence of this shoulder may simply be the result of its having become obscured beneath the relatively broad main peak of the polymer.

Example 3

Preparation of Polymers Having Varied Molecular Weights

The living character of nitroxide-mediated polymerization provides the capability for easy tuning of the desired molecular weight by merely varying the ratio of monomer to initiator. To demonstrate this, a series of polymerization reactions were performed at 123° C. using varying VDMO:initiator ratios (ranging from 50:1 to 1000:1). In each case, the polymerization was stopped after 4 h at approximately 90% conversion. As shown in FIG. 3, excellent control over molecular weight is obtained up to approximately 100 kDa, as illustrated by both a linear relationship between theoretical and experimental molecular weights and polydispersity values consistently under 1.10. At higher target molecular weights, the product polydispersities are slightly increased, ranging from about 1.10 to 1.20.

Example 4

Polymerization of Additional Oxazolone Monomers

We have also investigated the nitroxide-mediated LFRP of other oxazolone-functionalized monomers, such as 2-(4'-vinyl)phenyl-4,4-dimethyl-5-oxazolone (VPDMO) and 2-isopropenyl-4,4-dimethyl-5-oxazolone (IDMO).

A mixture of VPDMO (2.00 g, 9.30 mmol), acetic anhydride (8.8 $\mu$L, 0.093 mmol) and alkoxyamine 2 (11.8 mg, 0.047 mmol) in a vial was purged with nitrogen for 5 minutes and sealed. The mixture was stirred at 123° C. for 16 h. The solid plug was dissolved in chloroform, precipitated into hexanes, filtered and dried under vacuum, affording poly(VPDMO) as a fine white powder (1.68, 84%) $M_n$=43.6 kDa, PD=1.24.

The bulk homopolymerization of VPDMO at 123° C. in the presence of either alkoxyamine 2 or 3 gives similar results (Table 2). Both proceed to high conversions (>95%) after 16 h, with a similar degree of control being achieved regardless of initiator used. Namely, polydispersities for poly(VPDMO) consistently range from 1.20–1.30 regardless of the initiator used, target molecular weight, or additives.

Conversely, no appreciable degree of molecular weight control was obtained for the bulk homopolymerization of IDMO with either alkoxyamine initiator 2 or 3 (using the same reaction protocol). The resulting low molecular weight poly(IDMO) product was polydisperse, with values for $M_w/M_n$ typically well above 1.50, and in some cases the molecular weight distribution was multimodal. This was not altogether unexpected considering its structural and electronic similarity to methyl methacrylate. An enhanced degree of molecular weight control was achieved when IDMO was polymerized in the presence of alkoxyamine 2 with at least 30% styrene in the initial monomer feed. The resulting copolymers obtained approached target molecular weights and polydispersities ranged from 1.10–1.25.

TABLE 2

Bulk homopolymerization of VPDMO (200 equiv.) in the presence of an alkoxyamine initiator and additive at 123° C. for 16 h.

| INITIATOR | Additive | $M_n$ (kDa) | PDI |
|---|---|---|---|
| 2 | Ac$_2$O 2.0 equiv. | 32.8 | 1.30 |
| 2 | 1 0.05 equiv. | 25.3 | 1.27 |
| TEMPO | Ac$_2$O | 35.6 | 1.29 |

Example 5

Copolymerization of VDMO

Random (e.g., statistical) copolymers of VDMO and a second monomer were also achieved using nitroxide-mediated LFRP. In general, a solution of VDMO (1.00 g, 7.25 mmol), the desired comonomer (21.75 mmol), alkoxyamine 2 (36.7 mg, 0.116 mmol,) and nitroxide 1 (1.3 mg, 5.8 $\mu$mol) was degassed by three freeze/pump/thaw cycles and sealed under nitrogen. The solution was stirred at 123° C. until the reaction reached approximately 95% conversion (approximately 8 h for styrenics and approximately 16 h for acrylates). The solid reaction mixture was then dissolved in chloroform and precipitated into hexanes or ether (2L). The precipitate was filtered, washed with additional hexanes, and dried under vacuum.

Bulk copolymerization of VDMO with styrene at 123° C. was initially examined (Table 4). A solution of VDMO (1.00 g, 7.25 mmol), styrene (755 mg, 7.25 mmol), alkoxyamine 3 (18.9 mg, 0.058 mmol), acetic anhydride (11 microliter, 0.116 mmol) was degassed by three cycles of freeze/pump/thaw and sealed under nitrogen. The stirring solution was heated at 123° C. for 16 h. The clear, solid plug was then dissolved in chloroform and precipitated into hexanes (2L). The fine, white precipitate was filtered, washed with additional hexanes, and dried under vacuum to give the desired poly(VDMO) as a very fine white powder.

Monomer feed ratios were varied from 10% styrene to 90% styrene, confirming that excellent control over the polymer product is maintained, with polydispersities consistently at or below 1.10. At higher percentages of VDMO in the feed (>50%), addition of excess free nitroxide 1 (5%) was observed to preserve low polydispersities ($\leq$1.10).

Additives such as acetic anhydride and other acylating agents have been shown in the art to increase the rate of nitroxide-mediated polymerization of styrenic monomers (see, for example, Malmström et al. (1997) *Tetrahedron* 53:15225–15236). Addition of acetic anhydride (2 equivalents relative to alkoxyamine) to the bulk copolymerization reaction of the present invention also increased the rate of polymerization when styrene was the dominant comonomer. However, acetic anhydride had no measurable effect on the polymerization rate when the comonomer feed consisted predominately of VDMO.

Interestingly, the oxazolone ring (itself an acylating agent) had no observable effect on the homopolymerization of styrene. To demonstrate this, the bulk homopolymerization of styrene with alkoxyamine 1 was performed alone and in the presence of 2-pentadecyl-4,4-dimethyl-2-oxazolin-5-one (2.0 equivalents relative to alkoxyamine). At the several reaction timepoints examined (4 h, 6 h, and 8 h), there was no observable difference in conversion or molecular weight between the polystyrene prepared in the presence or absence of 2-alkyl oxazolone (Table 3)

TABLE 3

Effect of 2-pentadecyl-4,4-dimethyl-2-oxazolin-5-one 15 (2 equiv.) on bulk polymerization of styrene (250 equiv.) in the presence of alkoxyamine 1 at 123° C.

| Additive | Time | Conversion | Mn (kDa) | PDI |
|---|---|---|---|---|
| 15: 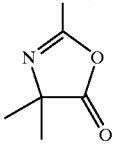 | 4 h | 65% | 16.9 | 1.04 |
| none | 4 h | 68% | 17.0 | 1.03 |
| 15 | 6 h | 85% | 21.9 | 1.04 |
| none | 6 h | 82% | 20.3 | 1.03 |
| 15 | 8 h | 98% | 27.6 | 1.05 |
| none | 8 h | 97% | 25.5 | 1.03 |

Example 6

Copolymerization of VDMO with Additional Monomers

Copolymerization of VDMO with several additional (i.e., non-styrenic) functional monomers was also examined (also shown in Table 4), as described for the previous example. For example, for a 1:3 ratio of VDMO:comonomer, a solution of VDMO (1.00 g, 7.25 mmol), the desired co-monomer (21.75 mmol), alkoxyamine 3 (36.7 mg, 0.116 mmol) and nitroxide 4 (1.3 mg, 5.8 mmol) was degassed by three cycles of freeze/pump/thaw and sealed under nitrogen. The stirring solution was heated at 123° C. for 16 h. The solid reaction mixture was then dissolved in chloroform and precipitated into either hexanes or ether (2L). The precipitate was filtered, washed with additional hexanes, and dried under vacuum.

In most cases, copolymerization of VMDO with non-styrenic monomers was generally tolerated, and afforded statistical (random) copolymers with low polydispersities ($\leq 1.30$) throughout a wide range of comonomer feed ratios. Well-defined random copolymers of VDMO and methyl methacrylate (MMA) could be prepared with high concentrations of MMA in the feed, with polydispersities below 1.25 even at MMA feed as high as 75%. Furthermore, copolymerization with acrylates and methacrylates did not result in termination via disproportionation or hydroxylamine elimination, as was determined by lack of alkene resonances (5.50–6.50 ppm) in the proton NMR spectral data. The present invention provides the preparation of well-defined reactive statistical/random copolymers with a wide variety of properties is readily feasible using α-hydrido nitroxide-mediated methodology.

TABLE 4

Random bulk copolymerization of VDMO

| Comonomer | VDMO/comonomer | $M_n$ (kDa) | PDI |
|---|---|---|---|
| styrene | 10/90 | 30.0 | 1.04 |
| | 20/80 | 28.7 | 1.07 |
| | 30/70 | 27.3 | 1.04 |
| | 40/60 | 31.2 | 1.09 |
| | 50/50 | 31.4 | 1.05 |
| | 60/40 | 32.5 | 1.07 |
| | 70/30 | 32.4 | 1.08 |
| | 80/20 | 33.7 | 1.07 |
| | 90/10 | 33.9 | 1.09 |
| 4-acetoxystyrene | 25/75 | 38.1 | 1.04 |
| | 75/25 | 36.1 | 1.05 |
| methyl acrylate | 25/75 | 10.7 | 1.21 |
| | 50/50 | 17.1 | 1.17 |
| | 75/25 | 34.6 | 1.22 |
| 2-methoxyethyl acrylate | 25/75 | 12.0 | 1.11 |
| | 50/50 | 15.1 | 1.12 |
| | 75/25 | 26.4 | 1.11 |
| butyl acrylate | 25/75 | 23.1 | 1.09 |
| | 50/50 | 37.1 | 1.27 |
| | 75/25 | 31.1 | 1.28 |
| t-butyl acrylate | 50/50 | 33.8 | 1.25 |
| methyl methacrylate | 10/90 | 22.2 | 1.39 |
| | 15/85 | 18.5 | 1.26 |
| | 25/75 | 18.1 | 1.24 |
| | 50/50 | 24.3 | 1.13 |
| | 75/25 | 25.2 | 1.15 |
| N,N-dimethylacrylamide | 25/75 | 20.6 | 1.22 |
| | 50/50 | 33.2 | 1.18 |
| | 75/25 | 27.7 | 1.22 |

TABLE 4-continued

Random bulk copolymerization of VDMO

| Comonomer | VDMO/ comonomer | $M_n$ (kDa) | PDI |
|---|---|---|---|
| 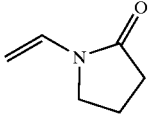 | 50/50 | 22.0 | 1.20 |
|  | 75/25 | 34.4 | 1.25 |
| 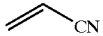 | 25/75 | 13.0 | 1.05 |
|  | 50/50 | 18.8 | 1.08 |
|  | 75/25 | 25.8 | 1.09 |

Example 7

Copolymerization of VPDMO with Second Monomers

VPDMO can also be copolymerized with any of the second monomers described herein. For example, for a 1:4 ratio of VDMO:comonomer, a mixture of VPDMO (400 mg, 1.86 mmol), the desired co-monomer (7.44 mmol), alkoxyamine 3 (12.1 mg, 0.0372 mmol), and acetic anhydride (7 microliter, 0.074 mmol) was degassed by three cycles of freeze/pump/thaw and sealed under nitrogen. The stirring solution was heated at 123° C. for 16 h. The solid reaction mixture was then dissolved in chloroform and precipitated into either hexanes or ether (2L). The precipitate was filtered, washed with additional hexanes, and dried under vacuum.

Example 8

Preparation of the Block Copolymer Poly(VDMO)-b-poly(Styrene)

In addition to having a narrow molecular weight distribution, poly(VDMO) chains prepared using nitroxide mediated LFRP methodology also bear a latent nitroxide-capped initiation center at the chain end. This reactive chain end can thus be employed in the preparation of block copolymers by the introduction of a second monomer. The synthesis of block copolymers via living free radical methodologies offers a unique advantage over anionic procedures especially in terms of its more extensive functional group compatibility. Reactive oxazolone-containing monomers such as VDMO have not been polymerized successfully using anionic procedures; hence, living free radical polymerization provides access to novel, well-defined block copolymers containing poly(VDMO) or other poly(oxazolone) segments.

Figure 5A:
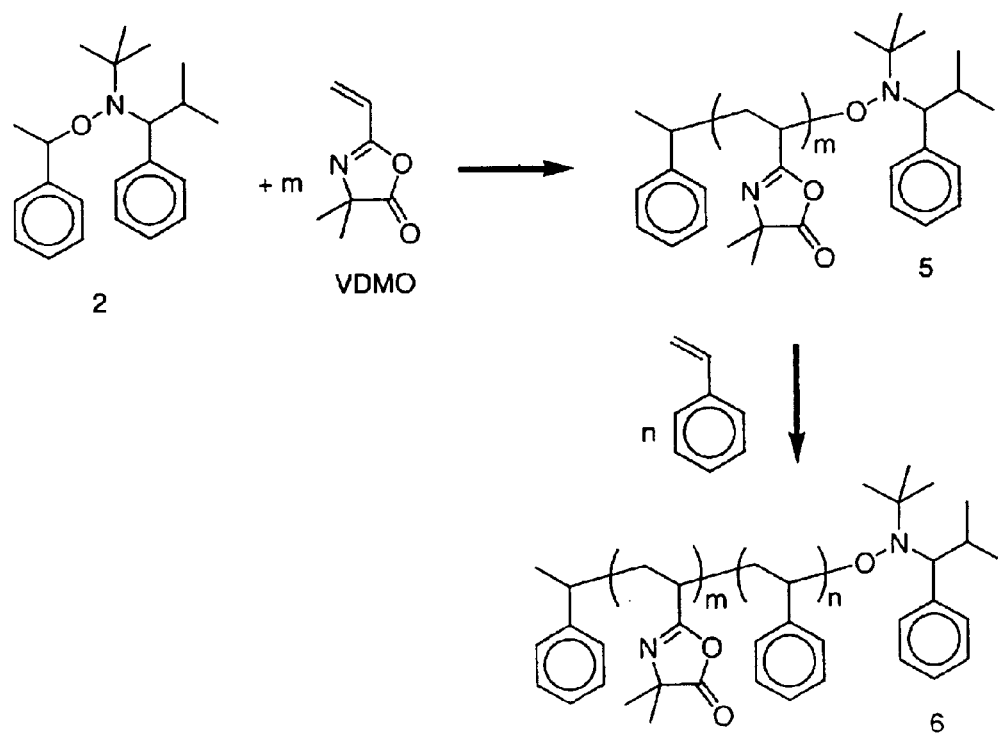
FIGS. 5A through 5F provide exemplary synthesis schemes for production of poly(oxazolone)-containing block copolymers.

Poly(VDMO) "macroinitiators" of several molecular weights were prepared by polymerization of VDMO in the presence of varying ratios of alkoxyamine initiator 2 and 5% nitroxide 1. For example, to prepare a poly(oxazolone)-containing block polymer, the poly(VDMO) block subunit was first prepared (compound 5 in FIG. 5A). A solution of VDMO (2.00 g, 14.4 mmol), alkoxyamine 2 (16.1 mg, 0.049 mmol) and nitroxide 1 (2.45 μmol) was degassed by three freeze/pump/thaw cycles and sealed under nitrogen. The stirring solution was heated at 123° C. for 4 h. The clear, solid plug was then dissolved in dichloromethane and precipitated into hexanes (2L). The fine, white precipitate was filtered, washed with additional hexanes, and dried under vacuum to give the desired poly(VDMO) 5 as a very fine white powder (1.71 g, 85%) $M_n$=25.0 kDa, PD=1.04.

The poly(VDMO) starting block 5 (0.80 g, 32 μmol) was dissolved in styrene (2.40 g, 2.3 mmol) and acetic anhydride (15 μL, 0.15 mmol), degassed by three freeze/pump/thaw cycles and sealed under nitrogen and heated to 123° C. for 8 h. The solid plug was then dissolved in chloroform and precipitated into hexanes, filtered, washed with hexanes, and dried under vacuum to afford poly(VDMO)-b-poly(styrene) as a white powder (2.67 g, 83%) $M_n$=90.8 kDa, PD=1.18, composition VDMO/styrene =30/70.

Figure 4:
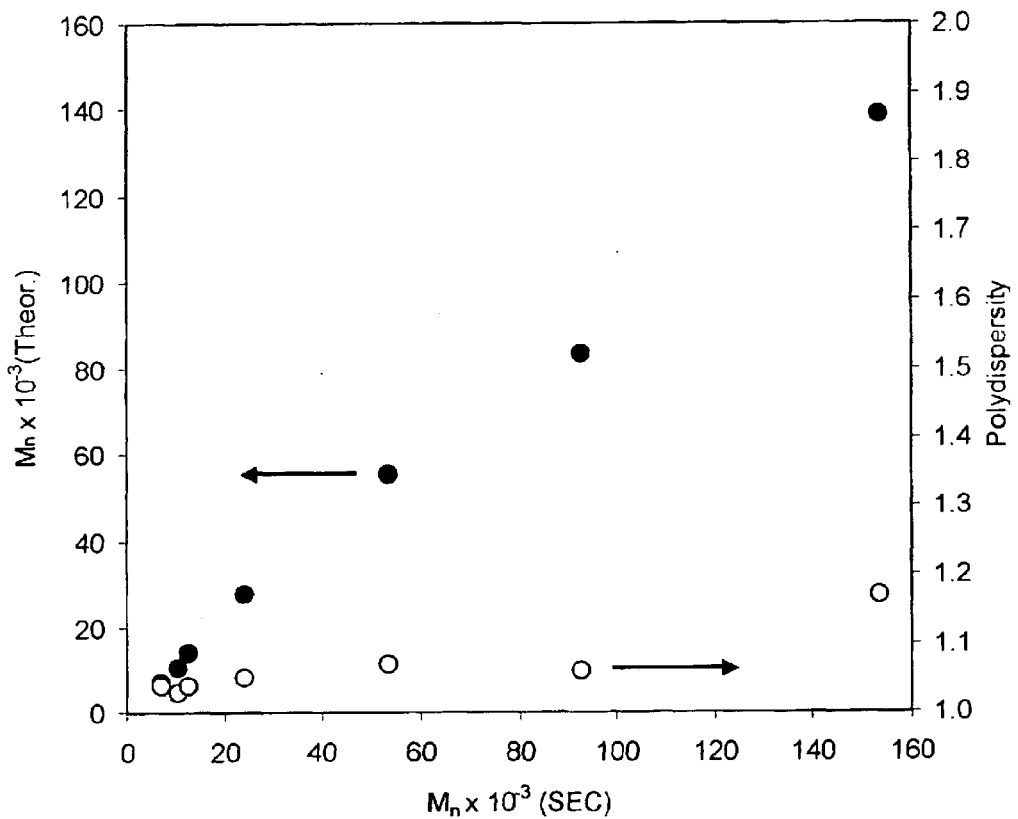
FIG. 4 demonstrates the relationship between theoretical molecular weight and experimental molecular weight (Mn) as a function of polydispersity for the bulk polymerization of VDMO.

In a first example (FIG. 5A), poly(VDMO) macroinitiator 5 ($M_n$=10.3 kDa, PD=1.03) was dissolved in styrene (300 equivalents), degassed, heated to 123° C. for 8 h and then purified by precipitation into hexanes. The resulting block copolymer poly(VDMO)-b-poly(styrene) 6 was obtained with high conversion for the styrene monomer and possessed the expected increase in molecular weight ($M_n$=34.3 kDa, PD=1.16). Comparison of SEC traces for macroinitiator 5 and diblock copolymer 6 shows no evidence of contamination of the diblock copolymer with unreacted VDMO macroinitiator (FIG. 4). This sequential polymerization strategy works well using VDMO macroinitiators with a range of molecular weights to allow preparation of well-defined block copolymers with molecular weights approaching 100 kDa (see Table 5).

Figure 5B:
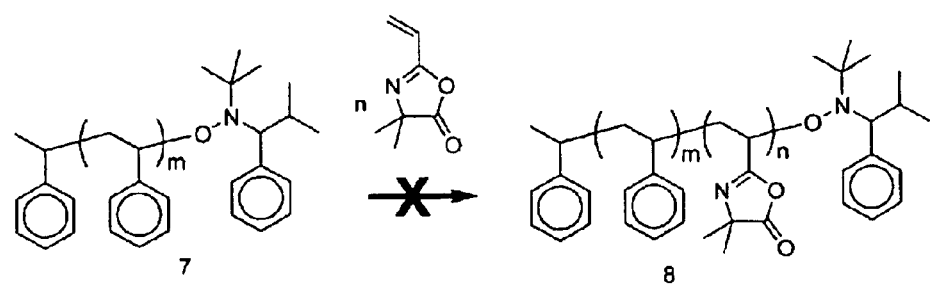

We have also made a number of attempts to prepare styrene/VDMO block copolymers by employing the reverse strategy, namely by growing a VDMO block from a poly(styrene) macroinitiator 7 (FIG. 5B). This strategy works well only when a relatively low molecular weight ($M_n$<10 kDa) poly(styrene) macroinitiator is used. Most attempts at preparing such block copolymers failed when using poly(styrene) macroinitiators with $M_n$>10 kDa, as evidenced by broad polydispersities and a persistent low molecular weight shoulder in the GPC traces. This is not surprising in light of previously reported results by Hawker and coworkers,[18] in which they demonstrated that the polymerization of acrylates from low molecular weight poly(styrene) macromonomers ($M_n$=4.5 kDa) resulted in well-defined block copolymers, but when higher molecular weight poly(styrene) macromonomers were used, the resulting block copolymers also possessed a low molecular weight shoulder (Benoit et al. (1999) J. Am. Chem. Soc. 121:3904–3920).

Example 9

VDMO/Acrylate Block Copolymers

Next, we investigated the preparation of VDMO/acrylate block copolymers. A mixture of alkoxyamine 2 (50.8 mg, 0.156 mmol), nitroxide 1 (7.8 μmol), and n-butyl acrylate (n-BA, 2.00 g, 15.6 mmol) was degassed by three freeze/pump/thaw cycles, sealed under nitrogen and heated to 123° C. for 16 h. Upon cooling to room temperature, the crude polymer 11 ($M_n$=13.6 kDa, PD=1.06) was dissolved in VDMO (2.00 g, 14.4 mmol), degassed by three freeze/pump/thaw cycles, sealed under nitrogen and heated to 123° C. for 4 h. The solid plug was then dissolved in dichloromethane and precipitated into hexanes, filtered, washed with hexanes, and dried under vacuum to afford poly(n-butyl acrylate)-b-poly(VDMO) 12 as a tacky white powder (3.16 g, 79%) $M_n$=34.9 kDa, PD=1.11.

Figure 5C:
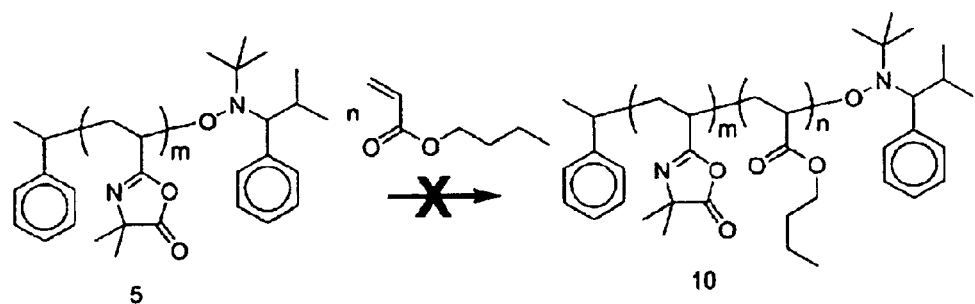
Figure 5D:
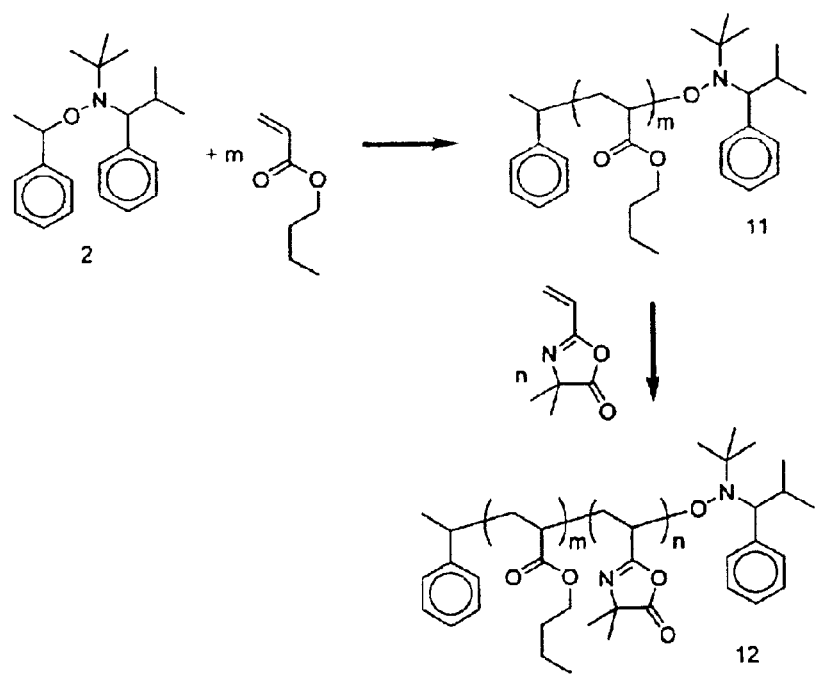
Figure 7:
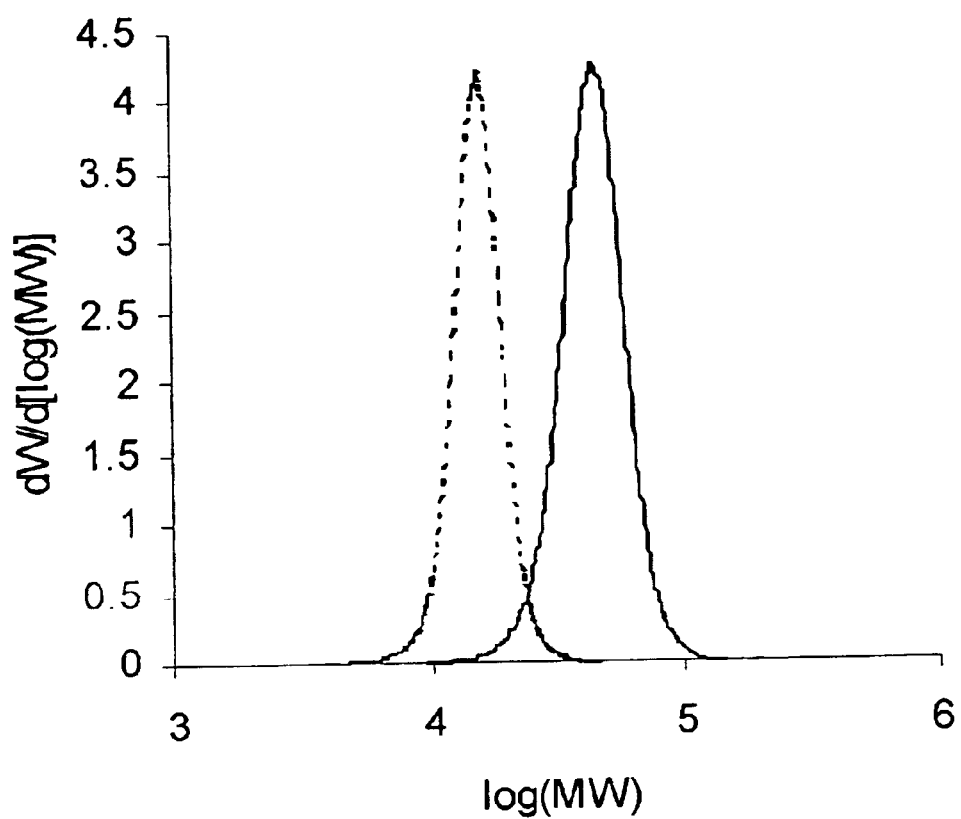
FIG. 7 provides a comparison of molecular weight distributions for (a) poly(n-butyl acrylate) macroinitiator 11 (dashed line) and (b) poly(n-butyl acrylate)-b-poly(VDMO) block copolymer 12 (solid line) after chain extension with VDMO.

In this case, successful polymerization was also dependent on nature of the initiating block. Specifically, in the case of poly(n-butyl acrylate)-b-poly(VDMO) 12, the use of a poly(n-butyl acrylate) starting block 11 (FIG. 5D) to initiate the polymerization of a second poly(VDMO) block results in well-defined block copolymers with no detectable quantities of unreacted poly(n-butyl acrylate) macroinitiator (FIG. 7). In fact, block copolymer formation proceeds smoothly and efficiently regardless of whether the second VDMO block is polymerized in a second step from an isolated poly(n-butyl acrylate) macroinitiator, or if the entire synthetic scheme is performed in a single pot (Table 6).

First, an alkoxyamine-functionalized poly(n-butyl acrylate) macroinitiator 11 is prepared by heating 100 equivalents of degassed n-butyl acrylate in the presence of alkoxyamine 2 and nitroxide 1 (5% relative to 2) at 123° C. for 16 h. The resulting poly(n-butyl acrylate) macroinitiator ($M_n$=14.9 kDa, PD=1.06) can be either isolated by precipitation into methanol prior to dissolution in VDMO or simply dissolved in VDMO, then the degassed polymerization solution is heated to 123° C. for 4 h, and precipitated into hexanes to give diblock copolymer poly(n-butyl acrylate)-b-poly(VDMO) (12). Block copolymer 12 is well-defined and possesses the expected increase in molecular weight ($M_n$=41.6 kDa, PD=1.09). Comparison of the molecular weight distributions of the poly(n-butyl acrylate) macroinitiator 11 and that of the resulting poly(n-butyl acrylate)-b-poly(VDMO) copolymer 12, clearly demonstrates that the block copolymer product 12 is free from any unreacted acrylate macroinitiator (FIG. 7).

In contrast, block copolymer formation by acrylate polymerization from an alkoxyamine functionalized VDMO starting block 5 (FIG. 5C) was unsuccessful despite attempts at changing several reaction parameters, including molecular weight of the VDMO macroinitiator, nature of acrylate monomer, monomer/macroinitiator ratio, and type and amount of solvent. In each attempt, incomplete initiation and/or early termination was observed and resulted in a multimodal product mixture containing both unreacted poly (VDMO) starting material and a higher molecular weight fraction, which could likely be either block copolymer or homopoly(n-butyl acrylate).

Several noteworthy observations can be drawn regarding the polymerization behavior of VDMO during the preparation of block copolymers. For example, when considering the preparation of styrene-VDMO block copolymers, the behavior of VDMO can be compared to that of n-butyl acrylate (or other acrylate monomers in general). Specifically, the polymerization of styrene from both poly (VDMO) and poly(n-butyl acrylate) macroinitiators is well controlled. However the reverse process typically fails, as polymerization of either VDMO or butyl acrylate from a poly(styrene) macroinitiator is successful only when a low molecular weight poly(styrene) macroinitiator is used. When considering the preparation of VDMO-acrylate block copolymers by nitroxide-mediated LFRP, VDMO behaves in a manner similar to isoprene. For example, the polymerization of VDMO from a poly(n-butyl acrylate) macroinitiator proceeds smoothly, leading to the formation of well-controlled n-BA-VDMO block copolymers. However, attempts to grow a poly(n-butyl acrylate) block from a poly(VDMO) macroinitiator did not lead to clean block copolymer formation. These results are analogous to those obtained by Hawker and coworkers whereby isoprene block polymerization from a poly(t-butyl acrylate) macroinitiator was shown to proceed efficiently, but the reverse process, namely polymerization of t-butyl acrylate from a poly (isoprene) macroinitiator was unsuccessful (Benoit 2000, supra). This suggests that VDMO behaves like an acrylate in polymerizability, but that terminal poly(VDMO) alkoxyamines are inefficient initiators for the synthesis of acrylate block copolymers.

TABLE 5

Molecular Weight and Polydispersity for Poly(VDMO)-b-poly(styrene) Block Copolymers Prepared Using 1 and 2 under Bulk Conditions at 123° C.

| Poly(VDMO) | | Poly(VDMO)-b-PSt block copolymer[b] | | |
|---|---|---|---|---|
| Starting Block | | Composition[a] | | |
| $M_n$ (kDa) | PDI | (VDMO/Styrene) | Mn (kDa) | PDI |
| 7.1 | 1.04 | 20/80 | 42.6 | 1.15 |
| 10.3 | 1.03 | 25/75 | 34.3 | 1.16 |
| 10.3 | 1.03 | 35/65 | 44.7 | 1.17 |
| 25.0 | 1.04 | 50/50 | 37.3 | 1.26 |
| 25.0 | 1.04 | 30/70 | 90.8 | 1.18 |

[a]Determined by 1H-NMR spectroscopy and C, H, & N elemental analysis.
[b]Polystyrene equivalent molecular weights.

TABLE 6

Molecular Weight and Polydispersity for Poly(n-butyl acrylate)-b-poly(VDMO) Block Copolymers Prepared Using 1 and 2 under Bulk Conditions at 123° C.

| Poly(n-BA) | | Poly(n-BA)-b-poly(VDMO)- block copolymer[b] | | |
|---|---|---|---|---|
| Starting Block | | Composition[a] | | |
| $M_n$ (kDa) | PDI | (VDMO/Sty) | $M_n$ (kDa) | PDI |
| 11.9 | 1.09 | 50/50 | 26.6 | 1.11 |
| 13.6 | 1.06 | 45/55 | 34.9 | 1.11 |
| 14.8 | 1.06 | 55/45 | 41.6 | 1.09 |
| 15.1 | 1.06 | 50/50 | 29.7 | 1.12 |
| 17.9 | 1.11 | 60/40 | 39.7 | 1.19 |

[a]Determined by 1H-NMR spectroscopy and C, H, & N elemental analysis.
[b]Polystyrene equivalent molecular weights.

Example 10

Preparation of Polymer:Amine Conjugates

To assess whether the oxazolone-containing polymers of the present invention were amenable to further modification, we examined the reaction of several representative poly (oxazolones) with amines. Poly(VDMO) 5 (500 mg, 3.68 mmol equiv, 17.0 kDa, PDI=1.03) was dissolved in dichloromethane (5.0 mL). Benzylamine (0.50 mL, 4.58 mmol) was added and the reaction mixture was stirred at room temperature for 4 hours, precipitated into methanol (400 mL), filtered, and dried under vacuum to afford 13 as a fine white powder (728 mg, 81%, 17.4 kDa, PDI=1.04); FRIR $cm^{-1}$ 1648 (CONH).

In a similar manner, poly(VDMO)-b-poly(styrene) 6 (500 mg, 44.7 kDa, PDI=1.17) was dissolved in dichloromethane (5.0 mL). Morpholine (0.50 mL) was added, and the reaction mixture was stirred at room temperature for 4 hours, precipitated into methanol (400 mL), filtered, and dried under vacuum to afford 14 as a fine white powder (514 mg, 45.4 kDa, PDI=1.19); FTIR $cm^{-1}$ 1621 (amide C=O).

Figure 5E:
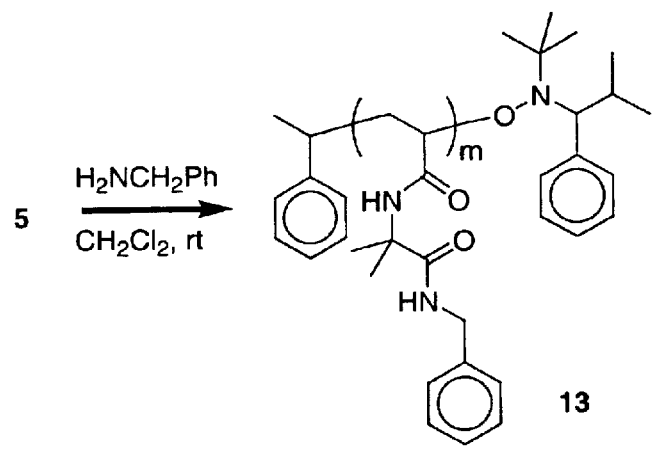
Figure 5F:
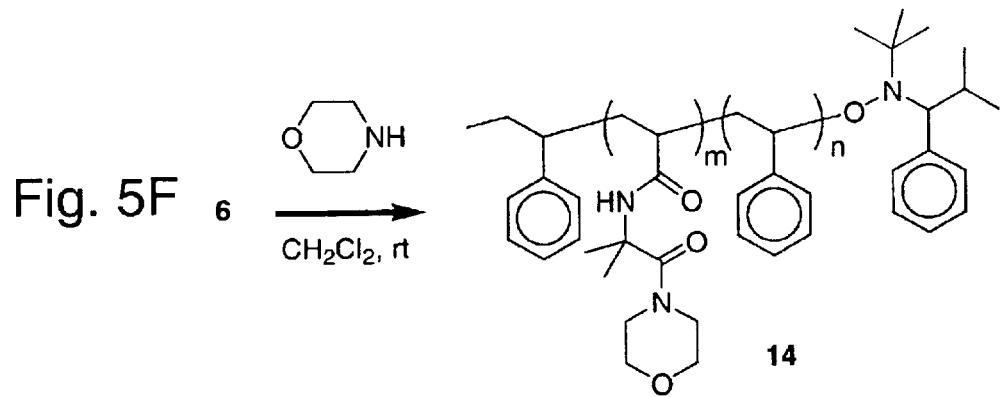
Figure 6:
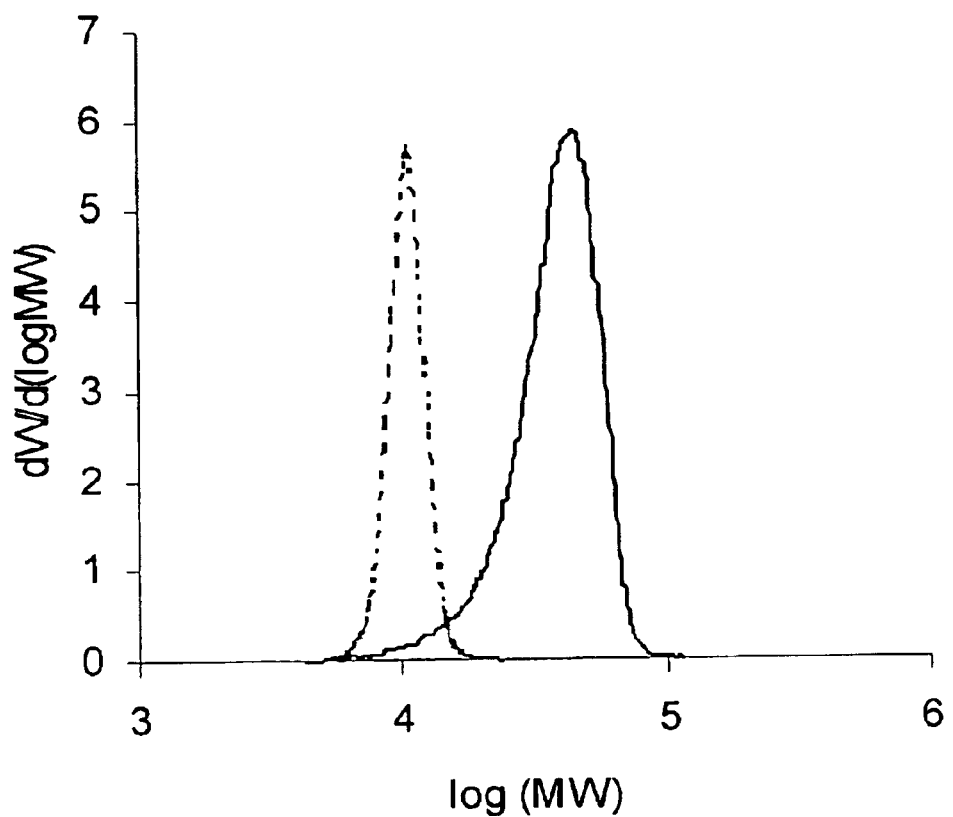
FIG. 6 provides a comparison of molecular weight distributions for (a) poly(VDMO) macroinitiator 5 (dashed line) and (b) poly(VDMO)-b-poly(styrene) block copolymer 6 (solid line) after chain extension with styrene.

Reaction of poly(VDMO) 5 with benzylamine (FIG. 5E) quantitatively affords benzyl acrylamide adduct 13 in excellent yield. Conversion was monitored by FTIR, which showed the disappearance of the characteristic oxazolone band at 1820 $cm^{-1}$ (C=O) and the appearance of the corresponding acrylamide band at 1648 $cm^{-1}$ (CONH). Likewise, reaction of poly(VDMO)-block-poly(styrene) 6 with morpholine (FIG. 5F) results in clean conversion to copolymer product 14, with the associated emergence of the amide band at 1621 cm$^{-1}$. Molecular weights and polydispersities of the poly(amide) products did not vary significantly from those of the starting materials. The facile chemical modification of poly(oxazolones) with amines and other weak nucleophiles demonstrates the potential for LFPR methods toward well-defined polymers containing rich chemical functionality.

Example 11

Preparation of Polymer:Drug Conjugates

Nitroxide-mediated living free radical polymerization provides a straightforward and highly efficient method for the controlled synthesis of poly(vinyl oxazolones) with narrow polydispersities. The synthesis of well-defined poly(oxazolones) afford access toward functional materials through facile polymer modification by reaction with nucleophiles. Alkoxyamine 2 has demonstrated a tremendous versatility in mediating the copolymerization of VDMO with a wide range of monomers. Furthermore, the synthesis of well-defined oxazolone-functionalized reactive block copolymers, inaccessible using anionic methods, was easily achieved using nitroxide-mediated LFRP methods. We are currently investigating applications of well-defined reactive oxazolone-functional materials with both compositional and architectural variation.

Figure 8A:
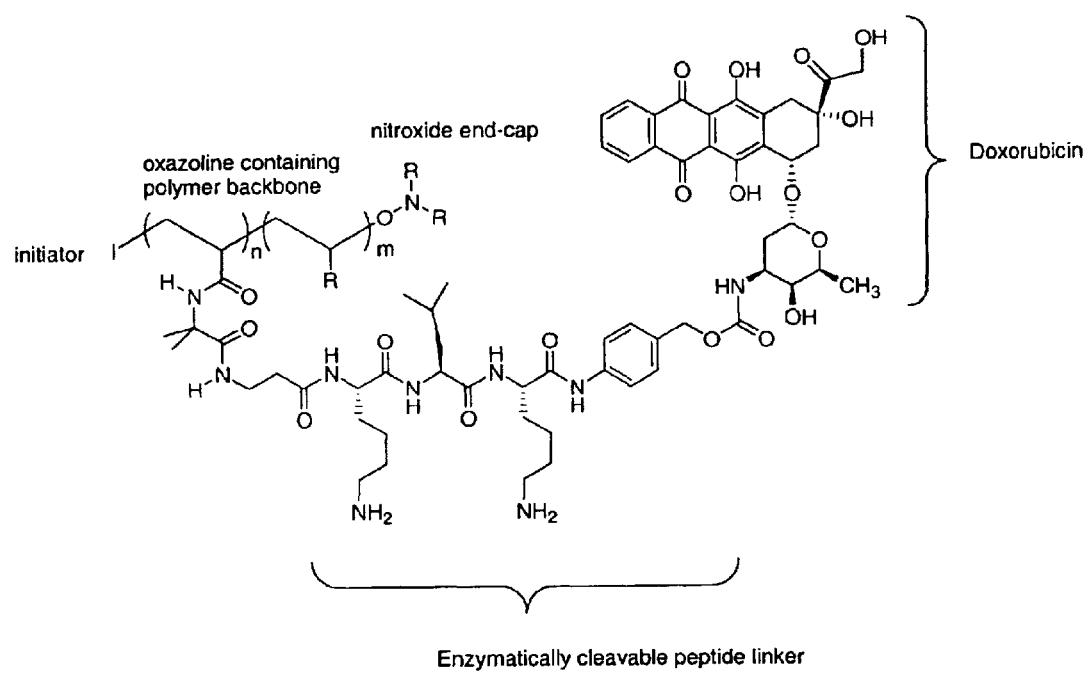
FIGS. 8A through 8C provide chemical structures for exemplary agent:polymer conjugates having an enzymatically-cleavable linker.
Figure 8B:
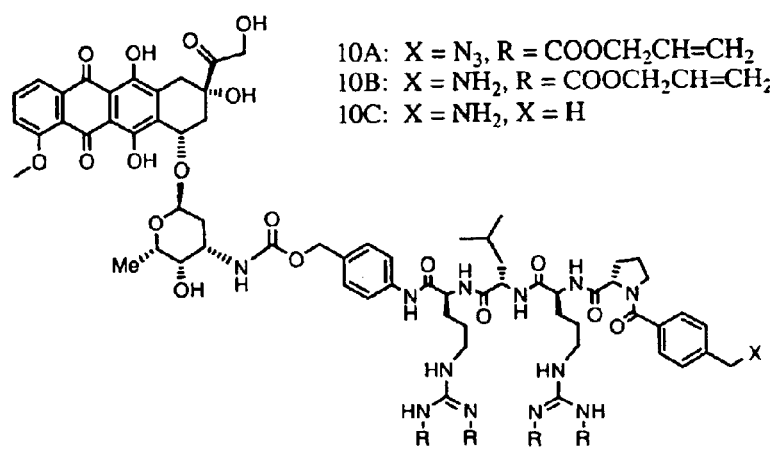
Figure 8C:
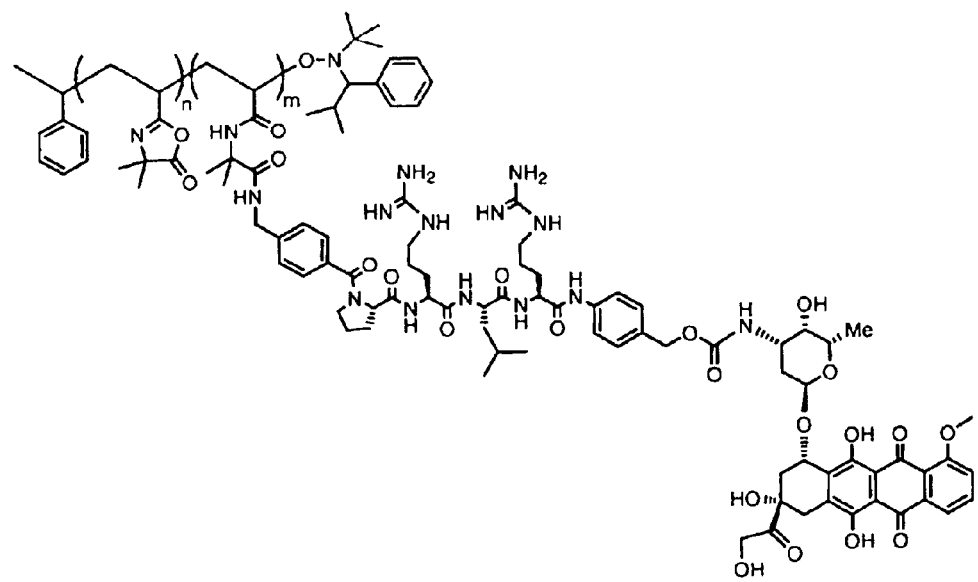

FIGS. 8A through 8C depict exemplary polymer:drug conjugates of the present invention. The peptide-drug conjugate portion is optionally prepared according to published procedures (see, for example, PCT publication WO 98/19705 "Preparation of branched peptide linkers" to King et al.)

For example, the doxorubicin compositions (compounds 10A through 10C) depicted in FIG. 8B can be coupled to an oxazolone-containing polymer of the present invention. Conjugation of the composition to the polymer is accomplished, for example, via the N-terminus of the peptide, by reaction in DMF, NMP or another suitable solvent.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method of synthesizing a poly(oxazolone) homopolymer via a nitroxide-mediated controlled living free radical polymerization reaction, the method comprising:
   providing a reactive polymer propagating species having a free radical moiety;
   reacting the reactive polymer propagating species with a first vinyl-functionalized oxazolone monomer, thereby producing an extended reactive polymer propagating species;
   coupling a nitroxide capping compound with the extended reactive polymer propagating species, thereby forming an intermediary dormant species;
   dissociating the nitroxide capping compound from the intermediary dormant species, thereby regenerating the extended reactive polymer propagating species, and
   repeating the reacting, coupling, and dissociating steps with additional vinyl-functionalized oxazolone monomers, thereby synthesizing the poly(oxazolone) homopolymer via a nitroxide-mediated controlled living free radical polymerization reaction.

2. The method of claim 1, wherein the oxazolone monomer comprises 2-vinyl-4,4-dimethyl-5-oxazolone (VDMO), 2-(4'-vinyl)-phenyl-4,4-dimethyl-5-oxazolone (VPDMO), 2-isopropenyl-4,4-dimethyl-5-oxazolone (IPMO), 2-vinyl-3-Oxa-1-azaspiro[4.5]dec-1-en-4-one, 2-vinyl-4,4-diethyl-5(4H)-oxazolone, 2-vinyl-3-oxa-1-azaspiro[4.4]non-1-en-4-one, 2-vinyl-4,4-dibutyl-5(4H)-oxazolone, 2-vinyl-4-ethyl-4-methyl-5(4H)-oxazolone, 4-methyl-4-propyl-2-vinyl-2-oxazolin-5-one, or 2-vinyl-4-methyl-4-phenyl-5(4H)-oxazolone.

3. The method of claim 1, wherein the nitroxide capping compound comprises a nitrosyl compound having an α-secondary carbon.

4. The method of claim 3, wherein the nitroxide capping compound comprises 1,1-dimethylethyl 2-methyl-1-phenylpropyl nitroxide or, 2,2,6,6-tetramethylpiperidine-1-oxyl (TEMPO).

5. The method of claim 1, wherein repeating the reacting, coupling, and dissociating steps generates a polymer having a polydispersity of less than or equal to 1.20 as determined by size exclusion chromatography.

6. The method of claim 5, wherein repeating the reacting, coupling, and dissociating steps generates a polymer having a polydispersity of less than or equal to 1.15.

7. The method of claim 5, wherein repeating the reacting, coupling, and dissociating steps generates a polymer having a polydispersity of less than or equal to 1.10.

8. The method of claim 1, wherein providing the reactive polymer propagating species comprises:
   a) providing a first monomer comprising the vinyl-functionalized oxazolone compound;
   b) providing an alkoxyamine compound capable of dissociating into a first nitroxide portion and a second free radical portion; and
   c) reacting the second free radical portion of the dissociated alkoxyamine compound with the first monomer, thereby forming a oxazolone propagating species.

9. The method of claim 8, wherein the alkoxyamine comprises a compound having the formula

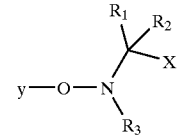

wherein X comprises a chemical moiety that destabilizes the Y—O bond, Y comprises the second free radical portion, and R1, R2 and R3 independently comprise a hydrocarbon or substituted hydrocarbon moiety.

10. The method of claim 8, wherein the alkoxyamine comprises N-(1,1-dimethylethyl)-α-(1-methylethyl)-N-(1-phenylethoxy)-benzenemethanamine or 2,2,6,6-tetramethyl-1-(1-phenylethoxy)-piperidine.

11. The method of claim 8, wherein the nitroxide capping compound used in the coupling step comprises the first nitroxide portion of the alkoxyamine compound.

12. The method of claim 8, wherein providing the alkoxyamine compound further comprises providing a 5% molar excess of free nitroxide.

13. The method of claim 1, wherein the reacting, coupling, and dissociating steps are performed at 100–130° C. for between 1 and 24 hours.

14. The method of claim 13, wherein the reacting, coupling, and dissociating steps are performed at 120–125° C. for between 4 and 16 hours.

15. The method of claim 13, wherein the reacting, coupling, and dissociating steps are performed at 123° C. for 4 hours.

16. The method of claim 1, wherein the additional vinyl-functionalized oxazolone monomers comprises the first vinyl-functionalized oxazolone monomer.

17. The method of claim 1, wherein the additional vinyl-functionalized oxazolone monomers comprises a mixture of two or more oxazolone monomers.

18. The method of claim 1, further comprising:
reacting the poly(oxazolone) homopolymer with an amine-functionalized agent to produce an agent-poly(oxazolone) conjugate.

19. The method of claim 18, wherein the amine-functionalized agent comprises a therapeutic agent, a contrast agent, a diagnostic agent, or a targeting agent.

20. The method of claim 1, further comprising:
reacting the poly(oxazolone) homopolymer with a hydroxyl-containing agent in the presence of a base to produce an ester-functionalized agent-poly(oxazolone) conjugate.

21. The method of claim 20, wherein the hydroxyl-containing agent comprises a therapeutic agent, a contrast agent, a diagnostic agent, or a targeting agent.

22. A method of synthesizing an oxazolone-containing copolymer via a nitroxide-mediated controlled living free radical polymerization reaction, the method comprising:
providing a plurality of monomers comprising a first set of vinyl-functionalized oxazolone compounds and a second set of second monomers;
providing a reactive polymer propagating species having a free radical moiety;
reacting the reactive polymer propagating species with a member of the plurality of monomers, thereby producing an extended reactive polymer propagating species;
coupling a nitroxide capping compound with the extended reactive polymer propagating species and forming an intermediary dormant polymer species;
dissociating the nitroxide capping compound from the intermediary dormant polymer species, thereby regenerating the extended reactive polymer propagating species; and
repeating the reacting, coupling, and dissociating steps with additional member monomers, thereby synthesizing the oxazolone-containing copolymer via a nitroxide-mediated controlled living free radical polymerization reaction.

23. The method of claim 22, wherein the first set of vinyl-functionalized oxazolone compounds comprises VDMO, VPDMO, IDMO, 2-vinyl-3-oxa-1-azaspiro[4.5]dec-1-en-4-one, 2-vinyl-4,4-diethyl-5(4H)-oxazolone, 2-vinyl-3-oxa-1-azaspiro[4.4]non-1-en-4-one, 2-vinyl-4,4-dibutyl-5(4H)-oxazolone, 2-vinyl-4-ethyl-4-methyl-5(4H)-oxazolone, 4-methyl-4-propyl-2-vinyl-2-oxazolin-5-one, or 2-vinyl-4-methyl-4-phenyl-5(4H)-oxazolone or a combination thereof.

24. The method of claim 22, wherein the first set of vinyl-functionalized oxazolone monomers comprises a mixture of two or more oxazolone monomers.

25. The method of claim 22, wherein the second set of second monomers comprises styrene, substituted styrene, alkyl acrylate, substituted alkyl acrylate, alkyl methacrylate, substituted alkyl methacrylate, acrylic acid, methacrylic acid, acrylonitrile, methacrylonitrile, acrylamide, N-alkylacrylamide, N-alkylmethacrylamide, N,N-dialkylacrylamide, N,N-dialkylmethacrylamide, isoprene, butadiene, ethylene, vinyl acetate, vinylidene chloride, vinylidene fluoride, vinyl chloride, vinyl fluoride, tetrafluoroethylene, 4-vinyl pyridine, 3-vinyl pyridine, 2-vinyl pyridine, N-vinyl amides or a combination thereof.

26. The method of claim 22, wherein the second set of second monomers comprises styrene monomers.

27. The method of claim 22, wherein the nitroxide capping compound comprises a nitrosyl compound having an α-secondary carbon.

28. The method of claim 27, wherein the nitroxide capping compound comprises 1,1-dimethylethyl 2-methyl-1-phenylpropyl nitroxide or, 2,2,6,6-tetramethylpiperidine-1-oxyl (TEMPO).

29. The method of claim 22, wherein providing the reactive polymer propagating species comprises reacting a first member of the plurality of monomers with an initiator compound capable of generating a free radical.

30. The method of claim 29, wherein the initiator compound comprises an alkoxyamine compound capable of dissociating into a first nitroxide portion and a second free radical portion.

31. The method of claim 29, wherein the alkoxyamine comprises a compound having the formula

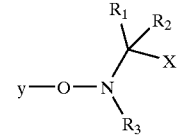

wherein X comprises a chemical moiety that destabilizes the Y—O bond, Y comprises the second free radical portion, and R1, R2 and R3 independently comprise a hydrocarbon or substituted hydrocarbon moiety.

32. The method of claim 29, wherein the alkoxyamine comprises N-(1,1-dimethylethyl)-α-(1-methylethyl)-N-(1-phenylethoxy)-benzenemethanamine or 2,2,6,6-tetramethyl-1-(1-phenylethoxy)-piperidine.

33. The method of claim 29, wherein the nitroxide capping compound comprises the first nitroxide portion of the alkoxyamine compound.

34. The method of claim 22, wherein providing the plurality of monomers comprises providing the first set of vinyl-functionalized oxazolone compounds and repeating the reacting, coupling, and dissociating steps prior to providing the second set of second monomers, thereby synthesizing an oxazolone-containing block copolymer.

35. The method of claim 22, wherein providing the plurality of monomers comprises providing a mixture of the first set of vinyl-functionalized oxazolone compounds and the second set of second monomers, thereby synthesizing an oxazolone-containing random copolymer.

36. The method of claim 35, wherein the plurality of monomers comprises 50% vinyl-functionalized oxazolone compounds and 50% second monomers.

37. The method of claim 35, wherein the plurality of monomers comprises 10% vinyl-functionalized oxazolone compounds and 90% second monomers.

38. The method of claim 35, wherein the plurality of monomers comprises 90% vinyl-functionalized oxazolone compounds and 10% second monomers.

39. The method of claim 22, further comprising:

reacting the poly(oxazolone) copolymer with an amine-functionalized agent to produce an agent-poly(oxazolone) copolymer conjugate.

40. The method of claim 18, wherein the amine-functionalized agent comprises a therapeutic agent, a contrast agent, a diagnostic agent, or a targeting agent.

41. The method of claim 1, further comprising:

reacting the poly(oxazolone) copolymer with a hydroxyl-containing agent in the presence of a base to produce an ester-functionalized agent-poly(oxazolone) copolymer conjugate.

42. The method of claim 20, wherein the hydroxyl-containing agent comprises a therapeutic agent, a contrast agent, a diagnostic agent, or a targeting agent.

43. A method of synthesizing an active agent-conjugated poly(oxazolone) polymer via a nitroxide-mediated controlled living free radical polymerization reaction, the method comprising:

providing a plurality of monomers comprising a first set of vinyl-functionalized oxazolone compounds and an optional second set of second monomers;

providing a reactive polymer propagating species having a free radical moiety;

reacting the reactive polymer propagating species with a member of the plurality of monomers, thereby producing an extended reactive polymer propagating species;

coupling a nitroxide capping compound with the extended reactive polymer propagating species and forming an intermediary dormant polymer species;

dissociating the nitroxide capping compound from the intermediary dormant polymer species, thereby regenerating the extended reactive polymer propagating species; and repeating the reacting, coupling, and dissociating steps with additional member monomers;

providing a functionalized active agent; and conjugating the functionalized active agent to the oxazolone-containing polymer, thereby synthesizing the active agent-conjugated oxazolone-containing polymer via a nitroxide-mediated controlled living free radical polymerization reaction.

44. The method of claim 43, wherein the first set of vinyl-functionalized oxazolone compounds comprises VDMO, VPDMO, IDMO, 2-vinyl-3-oxa-1-azaspiro[4.5]dec-1-en-4-one, 2-vinyl-4,4-diethyl-5(4H)-oxazolone, 2-vinyl-3-oxa-1-azaspiro[4.4]non-1-en-4-one, 2-vinyl-4,4-dibutyl-5(4H)-oxazolone, 2-vinyl-4-ethyl4-methyl-5(4H)-oxazolone, 4-methyl-4-propyl-2-vinyl-2-oxazolin-5-one, or 2-vinyl-4-methyl-4-phenyl-5(4H)-oxazolone or a combination thereof.

45. The method of claim 43, wherein the optional second set of second monomers comprises styrene, substituted styrene, alkyl acrylate, substituted alkyl acrylate, alkyl methacrylate, substituted alkyl methacrylate, acrylic acid, methacrylic acid, acrylonitrile, methacrylonitrile, acrylamide, N-alkylacrylamide, N-alkylmethacrylamide, N,N-dialkylacrylamide, N,N-dialkylmethacrylamide, isoprene, butadiene, ethylene, vinyl acetate, vinylidene chloride, vinylidene fluoride, vinyl chloride, vinyl fluoride, tetrafluoroethylene, 4-vinyl pyridine, 3-vinyl pyridine, 2-vinyl pyridine, N-vinyl amides or a combination thereof.

46. The method of claim 43, wherein the nitroxide capping compound comprises 1,1-dimethylethyl 2-methyl-1-phenylpropyl nitroxide or, 2,2,6,6-tetramethylpiperidine-1-oxyl (TEMPO).

47. The method of claim 43, wherein the functionalized active agent comprises one or more therapeutic agents, contrast agents, diagnostic agents, or targeting agents.

48. The method of claim 47, wherein the therapeutic agent comprises one or more peptides, proteins, antiproliferative agents, anti-cancer compounds, chemotherapeutic agents, antibiotics, antiviral agents, antiparasitic compounds, nucleic acids, or a combination thereof.

49. The method of claim 47, wherein the contrast agent comprises an MRI contrast agent, an X-ray contrast agent, a PET contrast agent, a CT contrast agent, an ultrasonography contrast agent, a fluorescent probe, a chromophore, a nucleic acid, a radioisotope, or a combination thereof.

50. The method of claim 43, wherein the functionalized active agent comprises an amine-functionalized or a hydroxyl-functionalized active agent.

51. The method of claim 43, wherein the functionalized active agent is coupled to the polymer via an enzymatically-cleavable linker.

52. The method of claim 43, wherein the poly(oxazolone) polymer comprises an oxazolone homopolymer.

53. The method of claim 43, wherein the poly(oxazolone) polymer comprises a random copolymer or a block copolymer.

54. The method of claim 43, wherein the functionalized agent for conjugation with the polymer comprises an amine-functionalized contrast agent or alcohol-functionalized contrast agent.

\* \* \* \* \*